United States Patent [19]

Fuwa

[11] Patent Number: 6,010,207
[45] Date of Patent: Jan. 4, 2000

[54] COLOR PRINTER AND PRINTING METHOD USING THE SAME

[75] Inventor: Shigehiro Fuwa, Tokorozawa, Japan

[73] Assignee: Citizen Watch Co., Ltd., Tokyo, Japan

[21] Appl. No.: 09/091,426

[22] PCT Filed: Aug. 30, 1996

[86] PCT No.: PCT/JP96/02444

§ 371 Date: Jun. 24, 1998

§ 102(e) Date: Jun. 24, 1998

[87] PCT Pub. No.: WO98/08686

PCT Pub. Date: Mar. 5, 1996

[51] Int. Cl.$^7$ .................................. B41J 2/21; B41J 29/38
[52] U.S. Cl. .................................................. 347/43; 347/9
[58] Field of Search ................................. 347/43, 5, 9, 40

[56] References Cited

U.S. PATENT DOCUMENTS

| | | | |
|---|---|---|---|
| 4,518,270 | 5/1985 | Hendrischk | 400/240.4 |
| 4,834,564 | 5/1989 | Oda | 400/568 |

FOREIGN PATENT DOCUMENTS

| | | |
|---|---|---|
| 58-194544 | 11/1983 | Japan . |
| 61-222778 | 10/1986 | Japan . |
| 64-24758 | 1/1989 | Japan . |
| 64-30757 | 2/1989 | Japan . |
| 3-244550 | 10/1991 | Japan . |

Primary Examiner—N. Le
Assistant Examiner—Thinh Nguyen
Attorney, Agent, or Firm—Armstrong, Westerman, Hattori, McLeland, & Naughton

[57] ABSTRACT

A color printer provided with ink jet heads comprising three trains of nozzle holes for respectively discharging different colored ink, each train of nozzle holes composed of a plurality of nozzle holes which are arranged at intervals of three pitches in the auxiliary scanning direction, and disposed at equal intervals in the main scanning direction while shifting every one pitch in the auxiliary scanning direction wherein different colored inks are discharged and sequentially superimposed over one another on a recording sheet to synthesize colors. The color printer further comprises control means for controlling the ink jet heads by discharging only one colored ink through the nozzle holes of any one of the three trains to make a print on the recording sheet as the first main scanning, then discharging ink through the nozzle holes of said train and another train adjacent to said train of nozzle holes to make a print as the scanned main scanning while they are shifted by one pitch in the auxiliary scanning direction, and thereafter discharging ink through the nozzle holes of the three trains to make a print as the next main scanning while they are shifted by one pitch in the auxiliary scanning direction, so as to make a print which is regular in sequence of superimposition of colors.

11 Claims, 16 Drawing Sheets

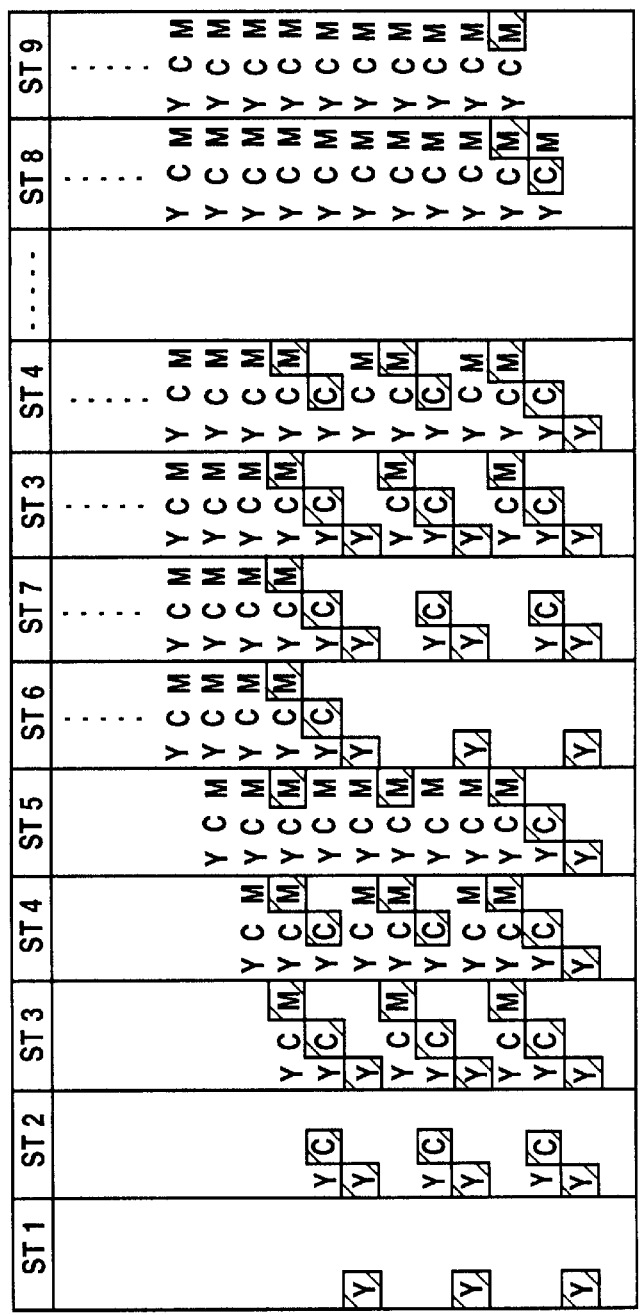
FIG.5
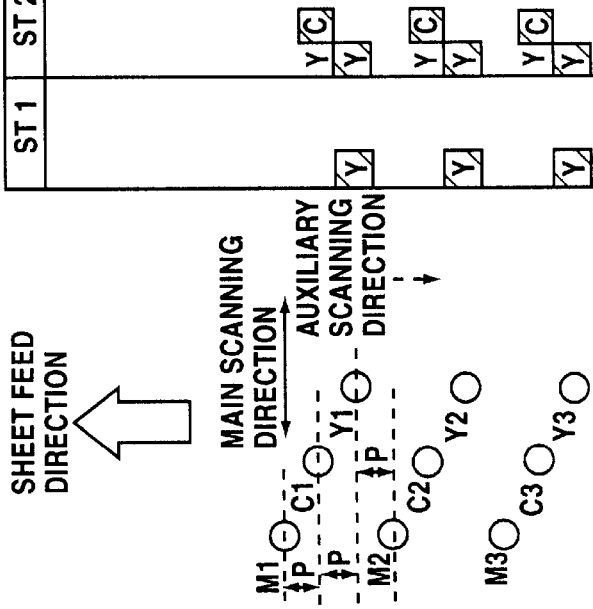

COLOR PRINTER AND PRINTING METHOD USING THE SAME

TECHNICAL FIELD

The present invention relates to a printer, particularly to a color printer for printing multiple colors provided with ink jet heads and a printing method using the color printer.

BACKGROUND TECHNOLOGY

A method of printing multiple colors by synthesizing colors on a recording medium (paper) is known, for example, as described in Japanese Patent Laid-Open Publication No. 3-244550.

According to this publication, there are provided a plurality of nozzle holes comprising first, second and third groups of nozzle holes respectively provided on the nozzle surfaces of ink jet heads for discharging magenta, cyan and yellow (hereinafter abbreviated as M, C and Y) ink, group by group. The multiple colors are printed by mounting the ink jet heads on a carriage and scanning in main and auxiliary scanning direction along the recording medium, and discharging ink from the nozzle holes.

In such a method, it is possible to synthesize printed dots of synthesized red, green and blue (hereinafter abbreviated as R, G and B) by precisely superimposing the printed dots of different primary colors (any of M, C and Y) over one another while shifting location by one pitch, or by integral times of one pitch, in the main or auxiliary scanning direction.

That is, it is possible to print synthesized multiple colors having no smudge therein with a relatively simple mechanism while performing a scanning operation which is not so different from that when printing monochrome. Accordingly, the multiple color printer using this method has quickly become widespread.

There are the following three kinds of methods employed in the aforementioned printing method.

First Method

This is a method, as shown in FIGS. 17 and 18, for making a print using printing heads on which groups of nozzle holes of different colors of M, C and Y are sequentially arranged in the auxiliary scanning direction.

This method comprises synthesizing colors by performing the main scanning while shifting every n pitch corresponding to respective groups of nozzle holes in the auxiliary scanning direction so that printed dots of different primary colors are superimposed over one another. Hereupon, the sequence of superimposition of the primary colors is always constant regardless of the normal or reverse direction of the main scanning direction (which is the same as the order of arrangement of the groups of different colors in the auxiliary scanning direction).

Accordingly, the tone of the same color in the printed image is always uniform even if the printing speed increases with bidirectional printing scanning. However, this is contrary to the demand for miniaturization and compactness of the apparatus because the dimensions of the heads in the auxiliary scanning direction increase, and hence the volume needed for the entire apparatus increases.

Second Method

This is a method, as shown in FIG. 19, for making a print using printing heads on which groups of n nozzle holes are provided for each different color of M, C and Y, and are sequentially arranged in the main scanning direction.

According to this method, the dimensions of the heads in the auxiliary scanning direction decrease, and hence the volume needed for the entire apparatus decreases. However, when printing, printed dots of different primary colors are superimposed over one another by n lines (width of n dots) under one-time main scanning which is not accompanied by scanning in the auxiliary scanning direction. Further, printed dots of different primary colors are superimposed over one another by n subsequent lines (by the lines extending from the n+1 line to the 2n line from the beginning) by performing scanning in the main scanning direction while shifting every next n pitch.

At this time, the sequence of superimposition of primary colors is reversed by reversing the main scanning direction, thereby changing the tone of the synthesized colors. Accordingly, when bidirectional printing scanning is performed, streaks are produced on the printed image every n pitch distance in the auxiliary scanning direction owing to the change of tone, thereby deteriorating the quality of the image.

Third Method

This is a method, as shown in FIG. 20, for making a print using printing heads on which groups of nozzle holes of different colors of M, C and Y are sequentially arranged in the main scanning direction while they are shifted by every one pitch (P) of printed dots in the auxiliary scanning direction.

In this case, the interval between respective groups of nozzle holes is three times as large as the pitch of the printed dots. Accordingly, the heads are easily manufactured. However, it is impossible to superimpose printed dots over one another by one time main scanning. Accordingly, it is necessary to superimpose printed dots of colors over one another by performing the main scanning while shifting the printed dots every one pitch (⅓ of the interval between nozzle holes of each group) in the auxiliary scanning direction.

Accordingly, in the first main scanning performed in first step ST1 as shown in FIG. 20, ink is prohibited from being discharged through a first nozzle hole M1 of an M group and a first nozzle hole C1 of a C group, while it can be discharged through other nozzle holes.

In FIG. 20, hatched portions represent colors to be printed in respective steps. Each dot represents that the printing is sequentially performed from the color positioned to its left.

Subsequently, in the second main scanning performed in second step ST2 after shifting by one pitch in the auxiliary scanning direction (sheet feeding by one pitch in a sheet feeding direction as denoted by the open arrow in the same figure), ink is prohibited from being discharged through the first nozzle hole M1 of the M group and ink can be discharged through other nozzle holes, if need be.

Next, in the third main scanning performed in third step ST3 after shifting further by one pitch in the auxiliary scanning direction (sheet feeding by one pitch), ink can be discharged through all nozzle holes.

Even in the fourth main scanning performed in fourth step ST4 after further shifting by (n−1)×3+1 pitches in the auxiliary scanning direction, ink can be discharged through all nozzle holes. Further, even in the fifth main scanning performed in fifth step ST5 after shifting by one pitch in the auxiliary scanning direction, ink can be discharged through all nozzle holes.

Even in the sixth main scanning performed in sixth step ST6 after shifting by one pitch in the auxiliary scanning direction, ink can be discharged through all nozzle holes. The sequence of colors of printed dots in each line where the printed dots are superimposed over one another by the main scanning in sixth step ST6 follows the order: YCM, MYC, CMY, YCM, MYC, . . . YCM, YC, Y from the leading line, which is the same state as shown in third step ST3.

Accordingly, in the main scanning, performed in seventh step ST7 after shifting by one pitch in the auxiliary scanning direction upon completion of printing, ink can be discharged only through the last (nth) nozzle hole Mn of the M group and the last nozzle hole Cn of the C group.

In eighth step ST8, after shifting by one pitch in the auxiliary scanning direction, ink can be discharged only through the last nozzle Mn of the M group to complete the printing.

That is, the print is made from the start of printing through the steps of ST1, ST2, ST3, ST4, ST5, ST6, ST4, ST5, ST6, . . . ST4, ST5, ST6, ST7 and ST8. At this time, the sequence of superimposition of the printed dots of colors as a whole is as follows from the leading line, namely: YCM, MYC, CMY, YCM, MYC, . . . CMY, YCM, YCM, YCM, YCM, MYC, CMY, YCM, MYC, . . . CMY, YCM, YCM, YCM, MYC, CMY, YCM, MYC, . . . CMY, YCM, YCM and YCM.

Regarding the sequence of Y and C according to the sequence of colors as set forth above, it is changed in some lines such as YC, YC, CY, YC, . . . . Even in the order of C and Y and M and Y, the reverse sequence of colors occurs likewise in some lines.

If the reverse of the sequence of colors occurs, R, G and B which are synthesized colors of each line are changed in tone, thereby producing streaks that deteriorate the quality of the image.

The sequence of superimposition of the printed dots of colors is always fixed regardless of the forward or reverse direction of the main scanning direction. Accordingly, such streaks can not be removed even if the main scanning direction is selected in either direction (i.e., even in the normal printing method or in the bidirectional printing scanning method).

It is, therefore, an object of the invention to remove streaks in printed images which are produced by the change of sequence of the superimposition of colors using a color printer provided with the ink jet heads which are used in the aforementioned third method.

It is another object of the invention to provide a small-sized color printer capable of solving the above problem and using ink jet heads which are easily manufactured, and a printing method capable of printing multiple colors which are uniform in image quality even if one-way printing or bidirectional printing is performed.

DISCLOSURE OF THE INVENTION

The color printer of the invention is provided with ink jet heads comprising three trains of nozzle holes for respectively discharging different colored ink, each train of nozzle holes composed of a plurality of nozzle holes which are arranged in the auxiliary scanning direction and spaced by three pitches, and the nozzle holes of the three trains of nozzle holes are disposed at equal intervals in the main scanning direction while shifting every one pitch in the auxiliary scanning direction wherein different colored inks are sequentially superimposed over one another on a recording medium (paper) to synthesize colors so as to male a color print, and to achieve the above object, the color printer further comprises control means for controlling the ink jet heads to make a print which is regular in the sequence of superimposition of colors by taking each of the following steps:

discharging only one colored ink through the nozzle hole of a first train of nozzle hole which is any one of the three trains of nozzle holes to make a print on the recording medium as the ink jet heads are scanned in the first train of main scanning direction in a first step;

discharging ink through the nozzle holes of the first train of nozzle holes and the nozzle holes of a second train of nozzle holes adjacent to the first train of nozzle holes to make a print on the recording medium as the ink jet heads are scanned in the main scanning direction while they are shifted by one pitch in the auxiliary scanning direction relative to the recording medium in a second step;

discharging ink through all nozzle holes of the first, second and remaining third trains of nozzle holes to make a print on the recording medium as the ink jet heads are scanned in the main scanning direction while they are shifted by one pitch in the auxiliary scanning direction relative to the recording medium in a third step;

discharging ink through all nozzle holes of the second and third trains of nozzle holes and only through the last nozzle hole of the first train of nozzle holes in the auxiliary scanning direction to make a print on the recording medium as the ink jet heads are scanned in the main scanning direction while they are shifted by one pitch in the auxiliary scanning direction relative to the recording medium in a fourth step;

discharging ink through all nozzle holes of the third train of nozzle holes and only through the last nozzle holes of the first and second trains of nozzle holes in the auxiliary scanning direction to make a print on the recording medium as the ink jet heads are scanned in the main scanning direction while they are shifted by one pitch in the auxiliary scanning direction relative to the recording medium in a fifth step;

discharging ink through all nozzle holes of the first train of nozzle holes and only through the first nozzle holes of the second and third trains of nozzle holes in the auxiliary scanning direction to make a print on the recording medium as the ink jet heads are scanned in the main scanning direction while they are shifted by $(n-1)\times 3+1$ pitches (n is the number of nozzle holes of each nozzle train) in the auxiliary scanning direction relative to the recording medium in a sixth step;

discharging ink through all nozzle holes of the first and second trains of nozzle holes and only through the first nozzle hole of the third train of nozzle holes in the auxiliary scanning direction to make a print on the recording medium as the ink jet heads are scanned in the main scanning direction while they are shifted by one pitch in the auxiliary scanning direction relative to the recording medium in a seventh step;

executing printing operations sequentially in the third to seventh steps;

discharging ink only through the last nozzle holes of the second and third trains of nozzle holes in the auxiliary scanning direction to make a print on the recording medium as the ink jet heads are scanned in the main scanning direction while they are shifted by one pitch in the auxiliary scanning direction relative to the recording medium in a step following the fifth step when ending the printing (in a eighth step); and then discharging ink only through the last nozzle hole of the third train of nozzle holes in the auxiliary scanning direction to make a print on the recording medium while the ink jet heads are scanned in the main scanning direction while they are shifted by one pitch in the auxiliary scanning direction relative to the recording medium so as to end the printing.

With the provision of this control means, the sequence of superimposition of colors of ink is always in the order as follows.

1. First color of ink which is discharged through the nozzle holes of the first train of nozzle holes.
2. Second color of ink which is discharged through the nozzle holes of the second train of nozzle holes adjacent to the first train of nozzle holes.
3. Third color of ink which is discharged through the nozzle holes of the third train of nozzle holes adjacent to the second train of nozzle holes.

Since the sequence of superimposition of colors is regular as mentioned above, there does not occur a case where image tone is changed to produce streaks in the printed image. Accordingly, multiple colors printing which are uniform in image quality can be printed.

Further, there are advantages that the reduction of printing speed is small, and streaks produced between the printed continuous portions are not prominent even if there occurs an error in sheet feeding amount when the ink jet heads are largely shifted in the auxiliary scanning direction relative to the recording medium in response to the number of nozzle holes of respective trains of nozzle holes as set forth in the above step 6.

Further, supposing that the control means set forth above is first control means, it is possible to provide selection means for selecting either the first control means or the following second control means to control the ink jet heads set forth above when printing.

The second control means comprises means for controlling the ink jet heads to make a print which is irregular in the sequence of superimposition of colors, by discharging ink through all nozzle holes to make a print on the recording medium while prohibiting ink from being discharged through respective first nozzle holes of two of the trains of nozzle holes of the three trains of nozzle holes (first nozzle holes in the auxiliary scanning direction) as the ink jet heads are scanned in the main scanning direction, then discharging ink through all nozzle holes to make a print on the recording medium while prohibiting ink from being discharged only through the first nozzle hole of either of the aforementioned two trains of nozzle holes (first nozzle hole in the auxiliary scanning direction) as the ink jet heads are scanned in the main scanning direction while they are shifted by one pitch in the auxiliary scanning direction relative to the recording medium, and thereafter discharging ink through all nozzle holes of the three trains of nozzle holes to make a print on the recording medium as the ink jet heads are scanned in the main scanning direction while they are shifted by one pitch in the auxiliary scanning direction relative to the recording medium.

With such an arrangement, it is possible to select the print mode depending on the object of printing and type of print data, namely, to select print mode using the first control means which is excellent in print image quality or to select the printing using the second control means which is fast in print speed.

The printing method using a color printer according to the invention is characterized in making a print on a recording medium which is regular in sequence of superimposition of colors by making each print in the same steps as respective steps executed by the first control means set forth above.

Further, suppose that the printing method of making a print which is regular in sequence of superimposition of colors is a first printing method, it may be possible to make a print by arbitrarily or automatically selecting the first printing method or a second printing method which is irregular in sequence of superimposition of colors by making each print in the same steps as respective steps executed by the second control means set forth above.

The selection of the aforementioned printing methods can be performed, for example, by the operation of an external member or by control data from a host for transmitting print data.

The selection may be performed automatically in response to printing modes for print data in the manner of selecting the second printing method if the printing mode is a photographic mode and of selecting the first printing method if the printing mode is a graphic mode.

BRIEF DESCRIPTION OF THE DRAWINGS

FIG. 5 is a view for explaining a state of printing according to the printing method in FIG. 4.

BEST MODE FOR CARRYING OUT THE INVENTION

Working examples of the invention will now be described in more detail with reference to the attached drawings.

Working Example of Color Printer

A color printer according to the working example of the invention will now be described with reference to FIG. 1 to FIG. 3.

Figure 1:
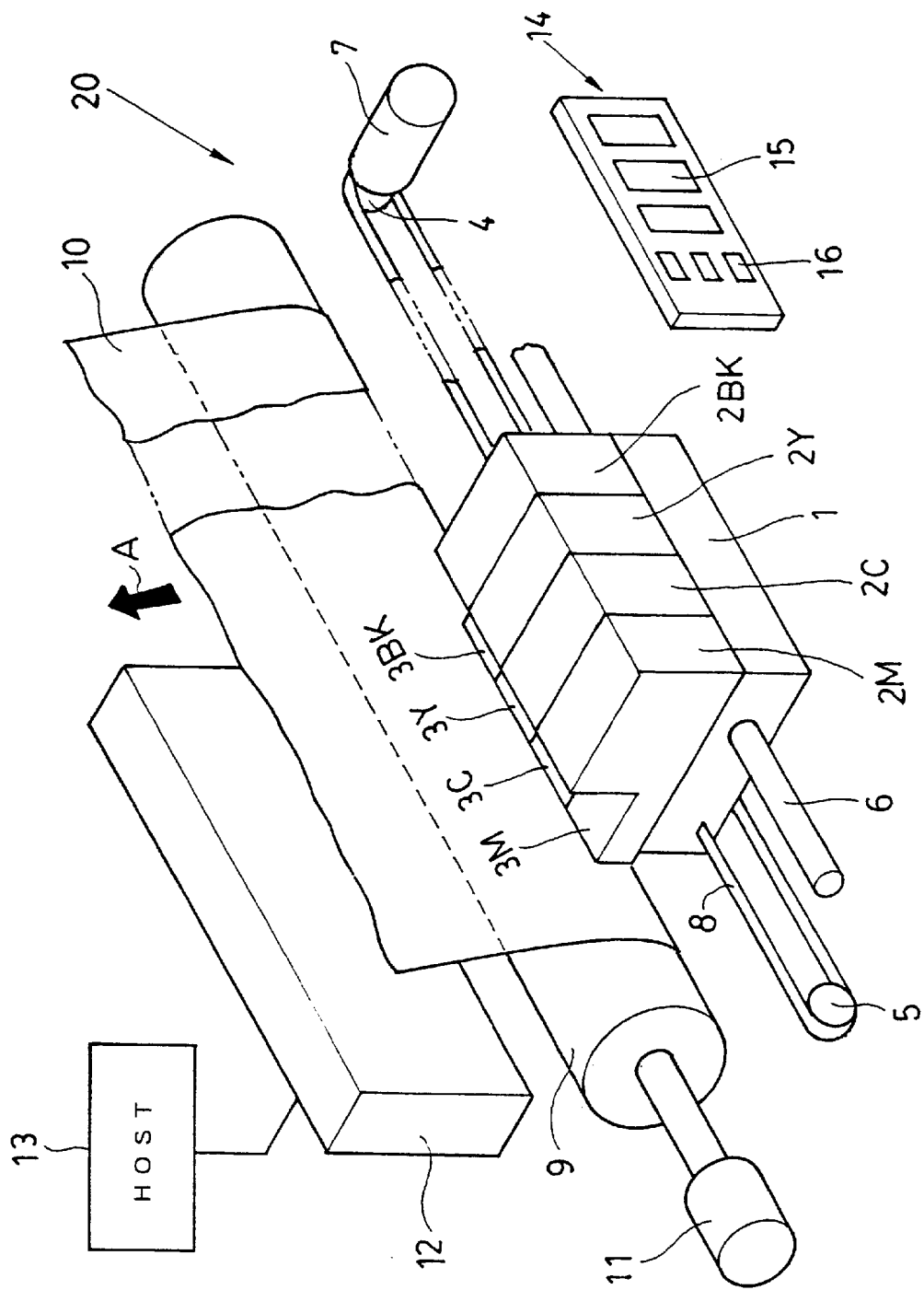
FIG. 1 is a perspective view showing the main portion of a mechanism of a color printer of the invention.
Figure 2:
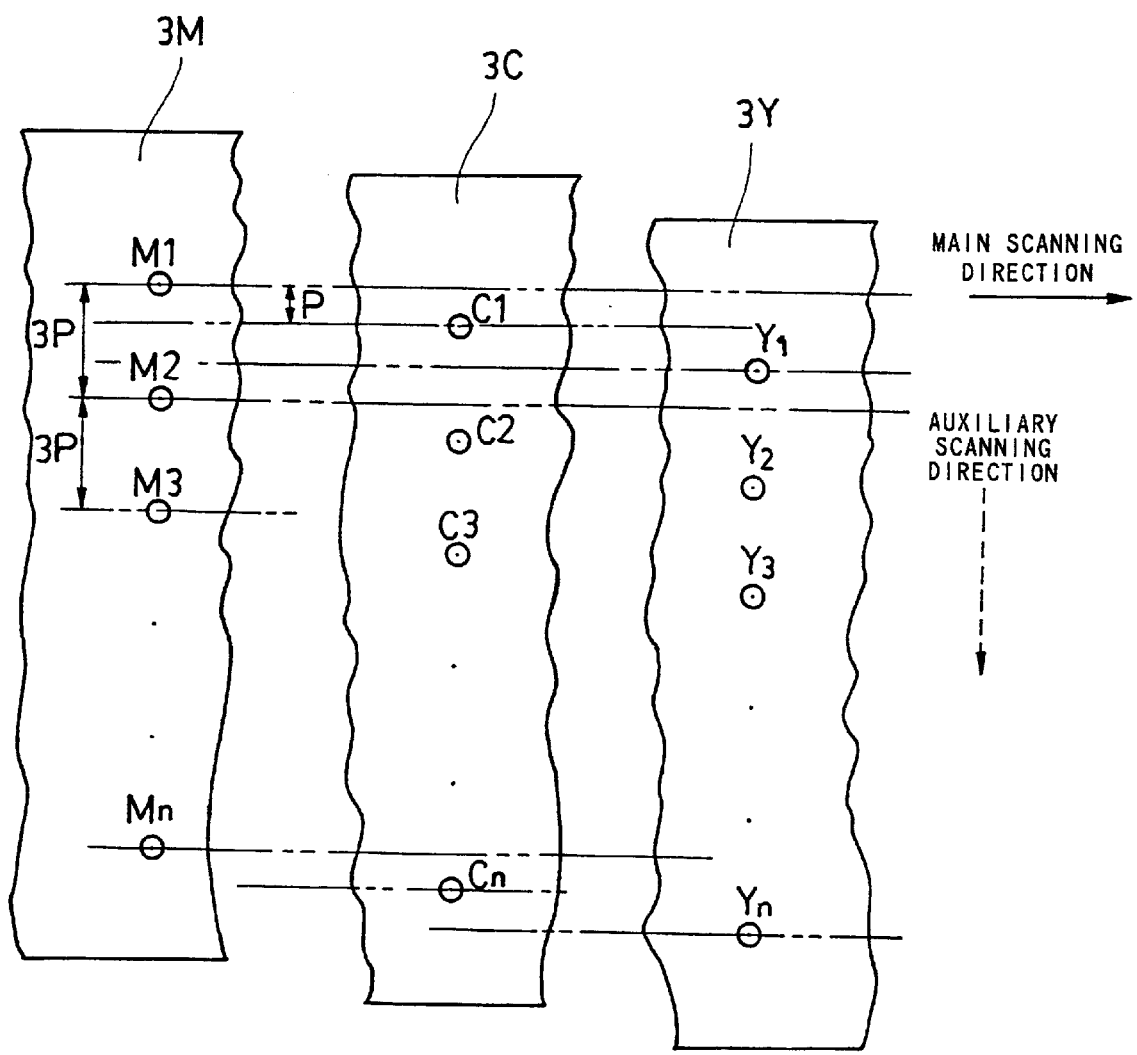
FIG. 2 is a view showing an example of arrangement of nozzle holes defined in heads of the color printer shown in FIG. 1.

FIG. 1 is a view showing a main portion of a mechanism of a color printer of the invention, and FIG. 2 is a view showing the arrangement of nozzle holes of the color printer 20 for discharging the primary colors M, C and Y.

A carriage 1 in FIG. 1 mounts thereon an ink tank 2M for M, an ink tank 2C for C, an ink tank 2Y for Y, an ink tank 2BK for black (BK), and an ink jet head 3M for M, an ink jet head 3C for C, an ink jet head 3Y for Y, an ink jet head 3BK for BK. These ink tanks and ink jet heads are arranged in the order of M, C, Y and BK from the left relative to the direction of a guide rail 6 for guiding the carriage 1.

A carriage motor 7 moves the carriage 1 reciprocally along the guide rail 6 via a timing belt 8 which extends between pulleys 4 and 5.

A platen 9 which is disposed parallel to the guide rail 6 guides a recording sheet (media) 10 so as to approach and oppose the ink jet heads 3M, 3C, 3Y and 3BK. A sheet feed motor 11 rotates the platen 9 to feed the recording sheet 10 in a direction of the arrow A.

Nozzle holes are arranged, relative to the recording sheet 10, on the surfaces of the ink jet head 3M for M, the ink jet head 3C for C, and the ink jet head 3Y for Y, respectively opposing the recording sheet 10 as shown in FIG. 2.

That is, an M group is disposed at the left end and it is composed of n nozzle holes M1, M2, ... Mn of the ink jet head 3M for M which each discharge M ink and are arranged in the auxiliary scanning direction (direction opposite to sheet feeding direction: downward in FIG. 2) and spaced at three pitches (3P) of recorded dots, as described later.

A C group is disposed at the right side of the M group and spaced at a given interval in the main scanning direction (moving direction of the carriage) while it is shifted further by one pitch in the auxiliary scanning direction (P: ⅓ of the interval between nozzle holes) and it is composed of n nozzle holes C1, C2, ... Cn of the ink jet head 3C for C which each discharge C ink and are arranged in the auxiliary scanning direction and spaced at three pitches.

A Y group is disposed at the right side of the C group and at a given interval in the main scanning direction while it is shifted further by one pitch in the auxiliary scanning direction (⅓ of the interval between the nozzle holes), and it is composed of n nozzle holes Y1, Y2, ... Yn which are respectively defined in the ink jet head 3Y for Y for discharging Y ink and are arranged in the auxiliary scanning direction and spaced at three pitches. In the color printer 20 shown in FIG. 1, the ink jet heads 3M, 3C, 3Y and 3BK, the carriage motor 7, the sheet feed motor 11, etc., are each controlled by a controller 12 serving as control means. The controller 12 is structured to be controlled by a host 13 such as a personal computer, etc.

An indicator 15 and an operation key 16 are respectively provided on an operation panel 14 serving as an I/O interface of the color printer 20 to an external device.

In the color printer 20, the ink jet head 3BK for BK is used for monochrome printing in black. The object in achieving the printing method according to the invention, described later, is printing monochrome or multiple colors using the ink jet heads 3M for M, 3C for C and 3Y for Y.

Figure 3:
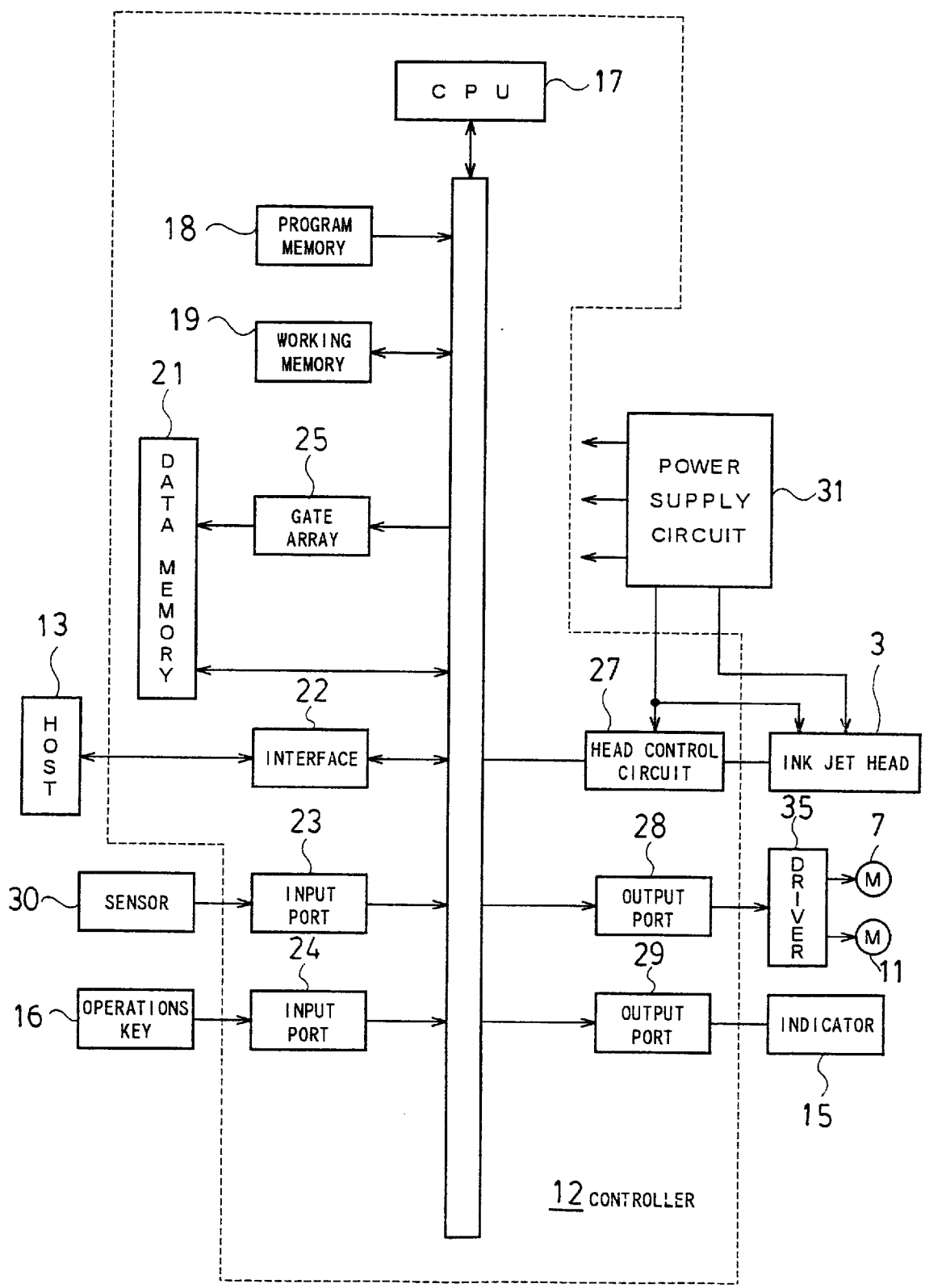
FIG. 3 is a block diagram showing an example of the construction of a control system mainly explaining a controller 12 of the color printer 20 shown in FIG. 1.

FIG. 3 is a block diagram showing an example of construction of a control system explaining mainly the controller 12 shown in FIG. 1.

The controller 12 comprises a CPU 17, a program memory (ROM) 18, a working memory (RAM) 19, a data memory (RAM) 21, an interface 22 for the host 13, an input port 23 for a sensor 30 including various sensors in the color printer, an input port 24 for the operation key 16, a gate array 25, a head control circuit 27, an output port 28 for a driver 35 of the carriage motor 7 and the sheet feed motor 11, and an output port 29 for the indicator 15.

A power supply circuit 31 supplies necessary voltage or power to the head control circuit 27, ink jet heads 3 (respective ink jet heads 3M for M, 3C for C, 3Y for Y and 3BK for BK in FIG. 1 are generally referred to as the ink jet heads 3), and to the controller 12, the driver 35, and the indicator 15, although the connecting lines between the power supply circuit 31 and these components are omitted for ease of illustration.

The gate array 25 is a logical circuit for converting print data to be inputted from the host 13 into M, C and Y data corresponding to a first printing method of the invention, described later, and storing the converted data into the data memory.

The controller 12 which serves as control means entirely controls respective components including the ink jet heads 3 by microcomputers mainly composed of the CPU 17, thereby executing the printing methods of the invention, described later.

Printing Method according to First Embodiment

The printing method to be executed by the color printer 20 according to the first embodiment of the invention will now be described.

Figure 4:
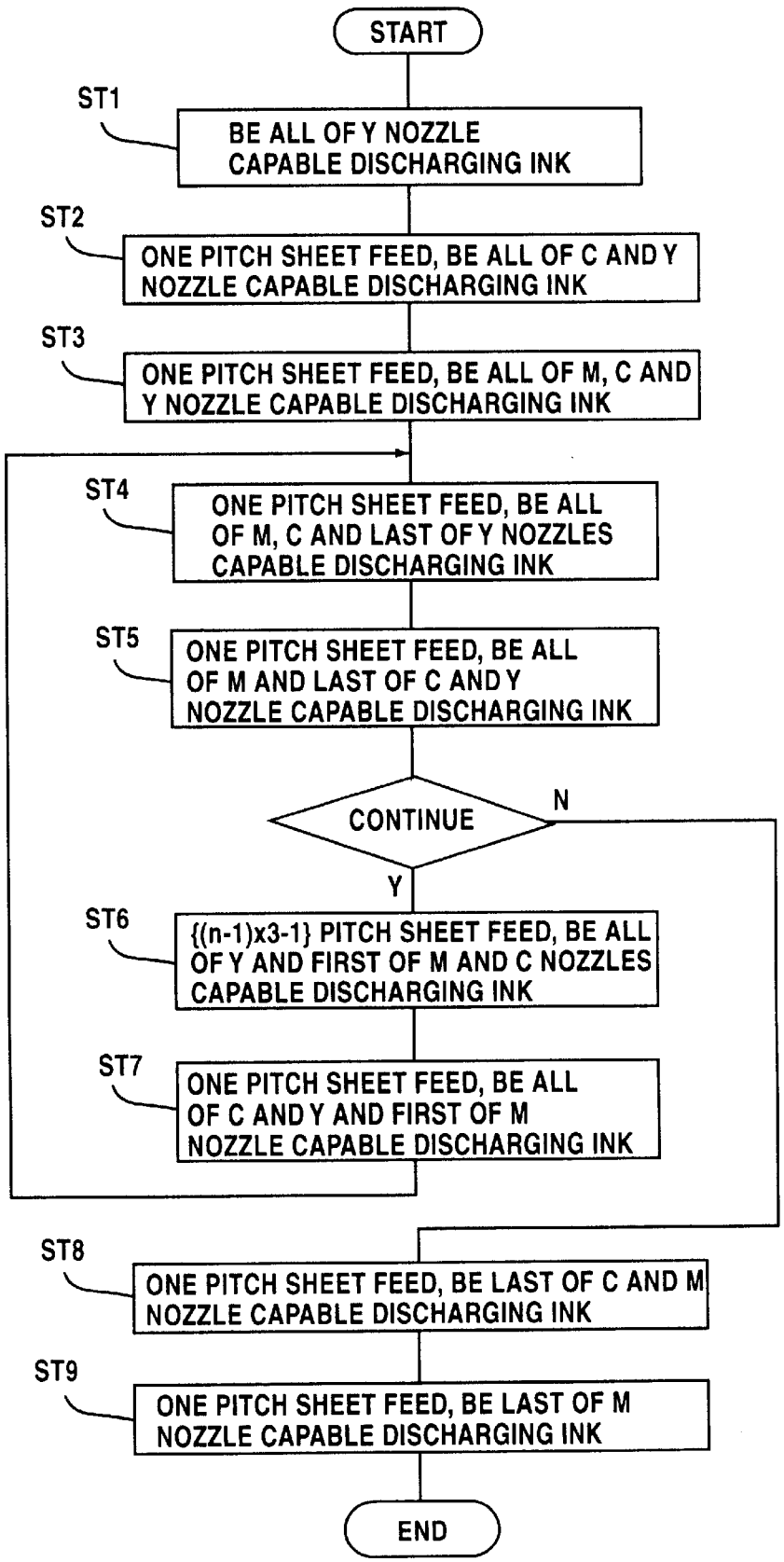
FIG. 4 is a flow chart showing procedures in a printing method according to a first embodiment of the invention using the color printer shown in FIG. 1.

FIG. 4 is a flow chart showing steps in the printing operation, and FIG. 5 is a view for explaining the sequence of colors to be printed corresponding to the respective steps.

Preparation for printing is done by starting up the color printer 20 and setting the carriage 1 at the printing start position.

First of all, in first step ST1 shown in FIG. 4 and FIG. 5, ink is prohibited from being discharged through all nozzle holes of the M group and C group. A main scanning is performed by moving the carriage 1 in a state where ink can be discharged from all nozzle holes of the Y group alone so that dots are printed every two lines based on the print data as shown in FIG. 5.

FIG. 5 shows a case where the number n of the nozzle holes of each group is expressed as n=3, and the nozzle holes capable of discharging ink have entirely discharged ink (this is applied hereinafter).

Next in second step ST2, the carriage is shifted relatively by one pitch of printed dots (P: ⅓ of the interval between nozzle holes) in the auxiliary scanning direction by feeding the recording sheet 10 in the direction as denoted by the arrow A shown in FIG. 1 (hereinafter to referred to as "one pitch sheet feed" in FIG. 4), that is, after one pitch auxiliary scanning, the main scanning is performed in a state where ink is prohibited from being discharged through all nozzle holes of the M group while ink can be discharged through all nozzle holes of the C group and Y group to print dots based on the print data.

As a result, as shown in FIG. 5, there is produced a line where no dot is printed, a line where dots of Y alone are printed and a line where dots of Y and C are printed while they are superimposed over one another in this order.

In third step ST3, the horizontal scanning is performed in a state where ink can be discharged through all nozzle holes of the M group, C group and Y group to make a dot print based on the print data after the carriage 1 is subjected to auxiliary scanning by one pitch upon completion of one pitch sheet feed. Accordingly, there is produced a line where dots of Y alone are printed, a line where dots of Y and C are printed while they are superimposed over one another in this order and a line where dots of Y, C and M are printed while they are superimposed over one another in this order.

In fourth step ST4, the main scanning is performed in a state where ink can be discharged through all nozzle holes of the M group and C group and through an nth nozzle hole Yn of the Y group (Y3 in the case of FIG. 5) to make a dot print based on the print data while ink is prohibited from being discharged through nozzle holes of the Y group other than the nozzle hole Yn after the carriage 1 is subjected to the auxiliary scanning by one pitch upon completion of one pitch sheet feed.

Accordingly, although there is produced a line where dots of Y alone are printed, a line where dots of Y and C are printed while they are superimposed over one another in this order and a line where dots of Y, C and M are printed while they are superimposed over one another in this order, the number of lines of Y alone are reduced, and the number of lines of Y and C and the number of lines of Y, C and M are increased, compared with the case of third step ST3.

In fifth step ST5, the main scanning is performed in a state where ink can be discharged through all nozzle holes of the M group and through an nth nozzle hole Cn of the C group (C3 in FIG. 5) and through an nth nozzle hole Yn of the Y group (Y3 in FIG. 5) to make a dot print based on the print data while ink is prohibited from being discharged through nozzle holes other than the nozzle holes Cn and Yn of the C and Y groups after the carriage 1 is subjected to auxiliary scanning by one pitch upon completion of one pitch sheet feed.

Accordingly, dots of Y, C and M are printed while they are superimposed over one another in this order except in the last two lines as shown in FIG. 5. The dots of Y alone are printed in the last line, and dots of Y and C are printed while they are superimposed over one another in this order in the second line from the last line.

Subsequently as shown in FIG. 4, it is judged whether the procedure of program continues or not, and the program goes to an eighth step ST8 if it does not continue while the program goes to a sixth step ST6 if it continues.

In sixth step ST6, the main scanning is performed in a state where ink can be discharged through a first nozzle hole M1 of the M group, a first nozzle hole C1 of the C group and all nozzle holes Y1 . . . Yn of the Y group to make a dot print based on the print data while ink is prohibited from being discharged thorough other nozzle holes after the recording sheet 10 is fed by (n−1)×3+1 pitches (seven pitches in FIG. 5), and the carriage 1 is shifted by the same pitch relatively in the auxiliary scanning direction, namely, it is subjected to auxiliary scanning by seven pitches.

As a result, dots of Y, C and M are printed while they are superimposed over one another in this order in the n×3 line from the last line (ninth line from the last line in FIG. 5) and the lines in ascending order, i.e. upward lines thereof. The dots Y and C are printed while they are superimposed over one another in this order in the n×3−1 line from the last line (eighth line from the last line in FIG. 5). In the n×3−2 line from the last line (seventh line from the last line in FIG. 5) and the lines in descending order, i.e. downward lines thereof, the dots are printed in the same manner as in first step ST1.

In seventh step ST7, the main scanning is performed in a state where ink can be discharged through the first nozzle hole M1 of the M group and all nozzle holes of the C group and Y group to make a dot print based on the print data while ink is prohibited from being discharged through other nozzle holes after the carriage 1 is subjected to auxiliary scanning by one pitch upon completion of one pitch sheet feed.

As a result, the dots of Y, C and M are printed while they are superimposed over one another in this order in the n×3 line from the last line (ninth line from the last line in FIG. 5) and the upward lines thereof. In then n×3−1 line from the last line (eighth line from the last line in FIG. 5) and downward, the dots are printed in the same manner as in second step ST2.

In the next step (eighth step from the first), the operation as made in third step ST3 is performed again. That is, the main scanning is performed in a state where ink can be discharged through all nozzle holes of the M group, C group and Y group to make a dot print based on the print data after the carriage 1 is subjected to auxiliary scanning by one pitch upon completion of one pitch sheet feed.

As a result, the dots of Y, C and M are printed while they are superimposed over one another in this order in the n×3 line from the last line (ninth line from the last line in FIG. 5) and the upward lines thereof. In the n×3 line from the last line (ninth line from the last line in FIG. 5) and the downward lines thereof, the dots are printed in the same manner as at first in third step ST3.

Further, in the next step (ninth step from the first), the operation in fourth step ST4 is performed.

As a result, the dots of Y, C and M are printed while they are superimposed over one another in this order in the n×3 line from the last line (ninth line from the last line in FIG. 5) and the upward lines thereof. In the n×3 line from the last line and the downward lines thereof, the print state becomes the same as at first in the fourth step ST4.

In such a manner, the program returns to third step ST3 after executing the operations respectively in fifth step ST5, sixth step ST6 and seventh step ST7, and thereafter the operations in third to seventh steps ST3 to ST7 are repeated.

Meanwhile, when the printing is completed, the programs in eighth step ST8 and a ninth step ST9 are sequentially executed following the fifth step ST5.

In eighth step ST8, the main scanning is performed in a state where ink can be discharged through an nth nozzle hole Mn of the M group (M3 in FIG. 5) and an nth nozzle hole Cn of the C group (C3 in FIG. 5) to make a dot print based on the print data while ink is prohibited from being discharged through other nozzle holes after the carriage 1 is subjected to auxiliary scanning by one pitch upon completion of one pitch sheet feed.

Accordingly, the dots are printed while they are superimposed over one another in the order of Y and C only in the last line. The dots are printed while they are superimposed over one another in the order of Y, C and M in all the remaining lines.

Next in ninth step ST9, the main scanning is performed in a state where ink can be discharged through the nth nozzle hole Mn of the M group (M3 in FIG. 5) to make a dot print based on the print data while ink is prohibited from being discharged through other nozzle holes after the carriage 1 is relatively subjected to the auxiliary scanning by one pitch upon completion of one pitch sheet feed. The dots are printed while they are superimposed over one another in the order of Y, C and M in all the lines. In such a manner, the printing operation using the ink jet heads of Y, C and M is completed.

According to the above mentioned printing method, since dots of primary colors of Y, C and M are printed while they are superimposed over one another in a regular order for each line of all, the tone of the synthesized colors R, G and B is not changed in some lines, thereby making a colored image print which is uniform in tone.

And also, since the sequence of superimposition of primary colors M, C and Y is not changed by the forward or reverse scanning direction in a main scanning, it is possible to make a colored image which is uniform in tone even when one-way printing or bidirectional printing is performed.

Printing Method According to Second Embodiment

A printing method according to the second embodiment will now be described with reference to FIG. 6 and FIG. 7.

The second embodiment relates to the printing method using the color printer 20 as employed by the first embodiment.

Figure 6:
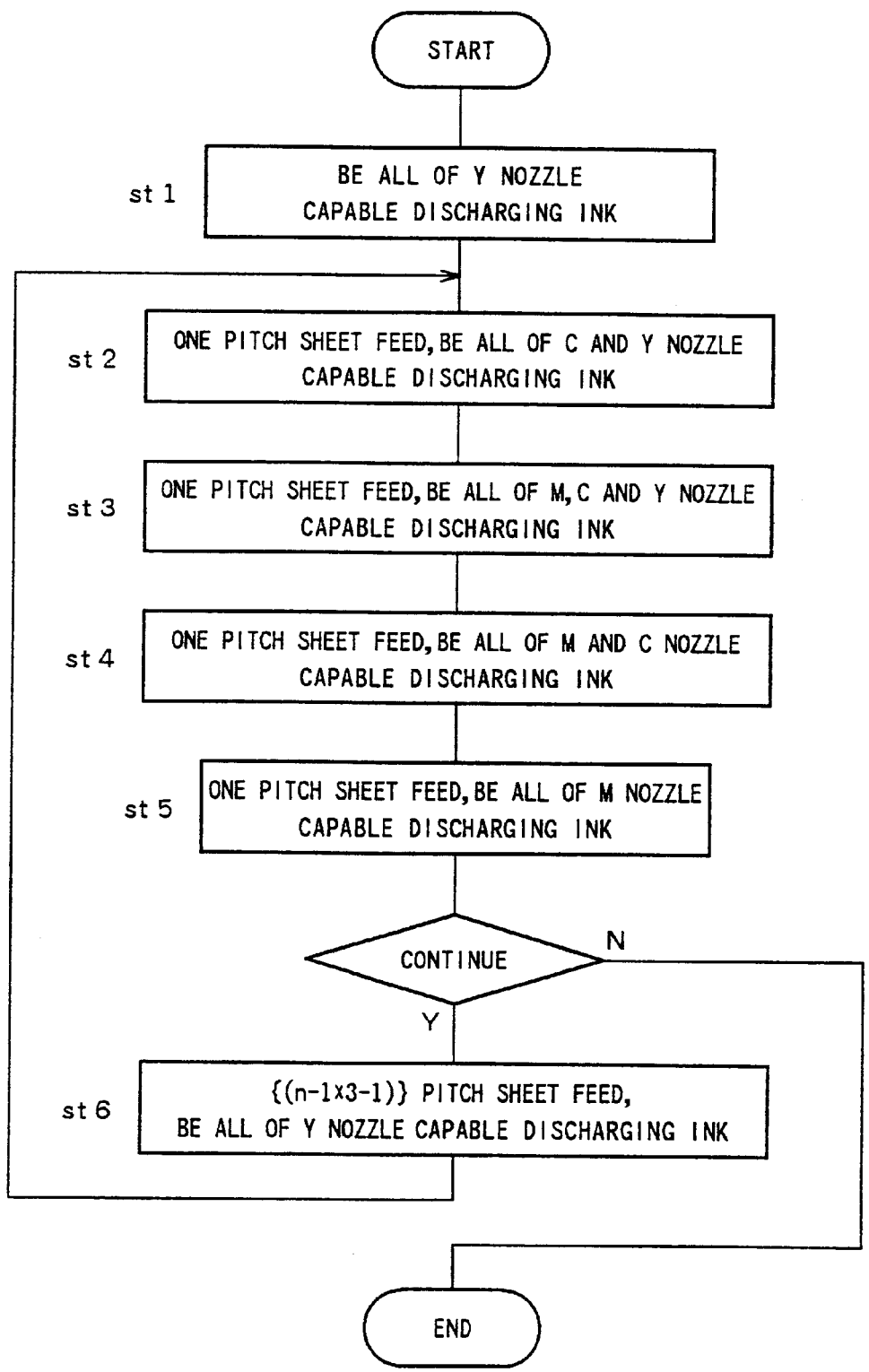
FIG. 6 is a flow chart showing procedures in the printing method according to a second embodiment of the invention using the color printer shown in FIG. 1.
Figure 7:
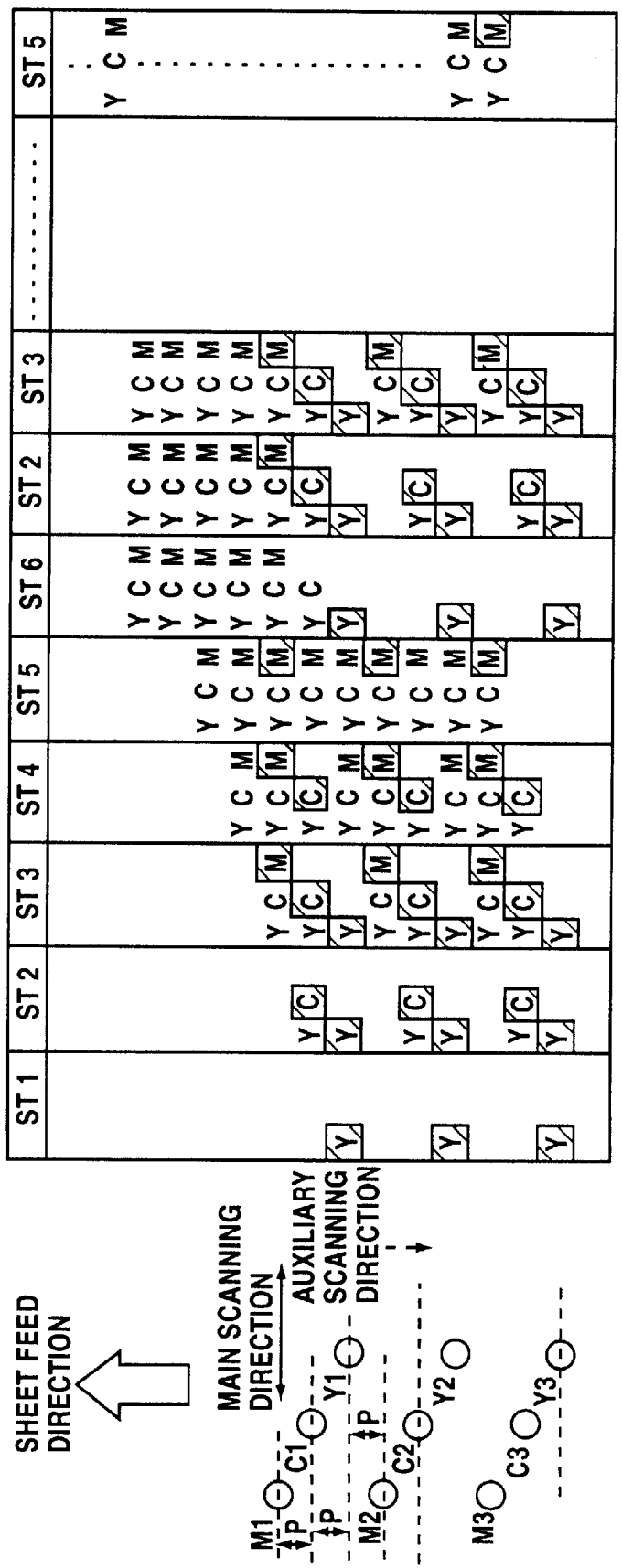
FIG. 7 is a view for explaining a state of printing according to the printing method in FIG. 6.

FIG. 6 is a flow chart showing steps in the printing method and FIG. 7 is a view for explaining print states in respective steps. FIG. 7 shows the case where the number n of nozzle holes of each group is expressed as n=3, and the nozzle holes capable of discharging ink have entirely discharged discharge ink.

The color printer 20 shown in FIG. 1 is started up, then the carriage 1 is set at a printing start position, thereafter the printing operations, which are the same as in first step ST1 of the first embodiment, are performed in a first step st1 as shown in FIGS. 6 and 7.

Next, the printing operation, which is the same as in second step ST2 of the first embodiment, is performed in a second step st2. Then the printing operation, which is the same as in third step ST3 of the first embodiment, is performed in a third step st3.

Further, main scanning is performed in fourth step st4 in a state where ink can be discharged through all nozzle holes of the M group and C group to make a dot print based on the print data while ink is prohibited from being discharged through other nozzle holes, namely, nozzle holes of the Y group after the carriage 1 is subjected to auxiliary scanning by one pitch upon feeding the recording sheet (one pitch sheet feed).

As a result, there is produced a line where the dots are printed while they are superimposed over one another in the order of Y and C, and a line where the dots are printed while they are superimposed over one another in the order of Y, C and M.

Then the main scanning is performed in fifth step st5 in a state where ink can be discharged through all nozzle holes of the M group to make a dot print based on the print data while ink is prohibited from being discharged through other nozzle holes after the carriage 1 is subjected to auxiliary scanning by one pitch sheet feed.

As a result, as shown in FIG. 7, dots are printed while they are superimposed over one another in the order of Y, C and M on all lines extending from a leading line to the line of n×3 (n=3 in FIG. 7 and this is applied hereinafter), and dots are not printed at all on the line other than those set forth above.

Subsequently, it is judged whether the procedure of program continues or not, and the program ends if it does not continue while the program goes to sixth step st6 if it continues, where the main scanning is performed in the same condition as in first step st1 after the carriage 1 is subjected to auxiliary scanning by (n−1)×3−1 pitches upon completion of sheet feed by the same pitch (five pitches in FIG. 7). That is, the main scanning is performed in a state where ink can be discharged from all nozzle holes of the Y group while it is prohibited from being discharged through other nozzle holes as set forth above.

As a result, the dots are printed while they are superimposed over one another in the order of Y, C and M in the line corresponding to the first nozzle hole M1 of the M group and all upward lines thereof, and the line immediately under this line (line corresponding to the first nozzle hole C1 of the C group), and the print state becomes the same as in first step st1 in the lines therebeneath.

In the next step, namely, in the seventh step, the same operation as in second step st2 is performed. That is, main scanning is performed in a state where ink can be discharged all nozzle holes of the C group and Y group to make a dot print based on the print data while it is prohibited from being discharged through other nozzle holes (all nozzle holes of the M group) after the carriage 1 is subjected to the auxiliary scanning by one pitch.

As a result, as shown in FIG. 7, dots are printed while they are superimposed over one another in the order of Y, C and M in the line corresponding to the first nozzle hole M1 of the M group and all lines upward thereof, and the print state becomes the same as in second step st2 in the line corresponding to the same line and the lines therebeneath.

In the subsequent step, namely, in the eighth step, the same operation as in third step st3 is performed. That is, main scanning is performed in a state where ink can be discharged from all nozzle holes of the M, C and Y group to make a dot print based on the print data after the carriage 1 is subjected to auxiliary scanning by one pitch.

As a result, as shown in FIG. 7, dots are printed while they are superimposed over one another in the order of Y, C and M in all lines upward of the line corresponding to the first nozzle hole M1 of the M group, and the print state becomes the same as in third step st3 in the same line and the lines therebeneath.

In such a manner, the program returns to second step st2 upon completion of the execution of fourth step st4, fifth step st5 and sixth step st6, and respective second step st2 to sixth step st6 are circularly executed while the program continues. The execution of fifth step st5 may be completed not making a print.

As a result, dots are printed while they are superimposed over one another in the order of Y, C and M in all lines.

The second embodiment has the same effect as the first embodiment. Further, the control of the operations can be simplified compared with the first embodiment.

However, in the first embodiment, there is a repeated step (ST6) where the carriage 1 is subjected to auxiliary scanning by (n−1)×3+1 pitches upon completion of four steps (ST7, ST3, ST4 and ST5) where the recording sheet is fed pitch by pitch.

Accordingly, the recording sheet is fed by (n−1)×3+5 pitches through five steps. On the other hand, in the second embodiment, there is a repeated step where the carriage 1 is subjected to the auxiliary scanning by (n−1)×3−1 pitches upon completion of four steps (st6, st2, st3 and st4) where the recording sheet is fed pitch by pitch.

Accordingly, the recording sheet is fed by (n−1)×3+3 pitches through five steps. As is evident from the above, the first embodiment is slightly more advantageous than the second embodiment in respect of printing speed.

In the first embodiment, the dots of YC and M are already printed on the portion of the recording sheet to be printed through the nozzle holes M1 and C1 after the recording sheet is fed by (n−1)×3+1 pitches in step ST6, and this printing is performed continuously with the line immediately before this line. Accordingly, even if there occurs a precision error in sheet feeding amount when the recording sheet is fed by (n−1)×3+1 pitches, the influence caused by this error is small, thereby producing an advantage that any streaks produced between the printed continuous portions are not prominent.

Meanwhile, if there occurs a precison error in the sheet feeding amount when the recording sheet is fed by (n−1)×3−1 pitches so as to start the printing afresh in sixth step sT6 of the second embodiment, the influence due to this error appears as it is. For example, there frequently occurs white streaks or the overlapping of printed dots.

Printing Method According to Third Embodiment, and the Color Printer

Next, a printing method according to the third embodiment of the invention and the color printer used by this printing method will now be described with reference to FIG. 8 to FIG. 11.

The color printing method of the invention in which the sequence of superimposition of colors is regular and which was explained as the first and the second embodiments is hereinafter defined as the "first printing method". Further, a color printing method in which the sequence of superimposition of colors is not regular and which was explained with reference to FIG. 20 as the "third prior art" is defined as the "second printing method".

The color printer and the printing method obtained by this color printer can print by arbitrarily selecting either the first or second printing method.

The color printer used in this embodiment is the same in mechanism as the color printer 20 as shown in FIG. 1, but the construction of the controller constituting the control system is slightly different.

Figure 8:
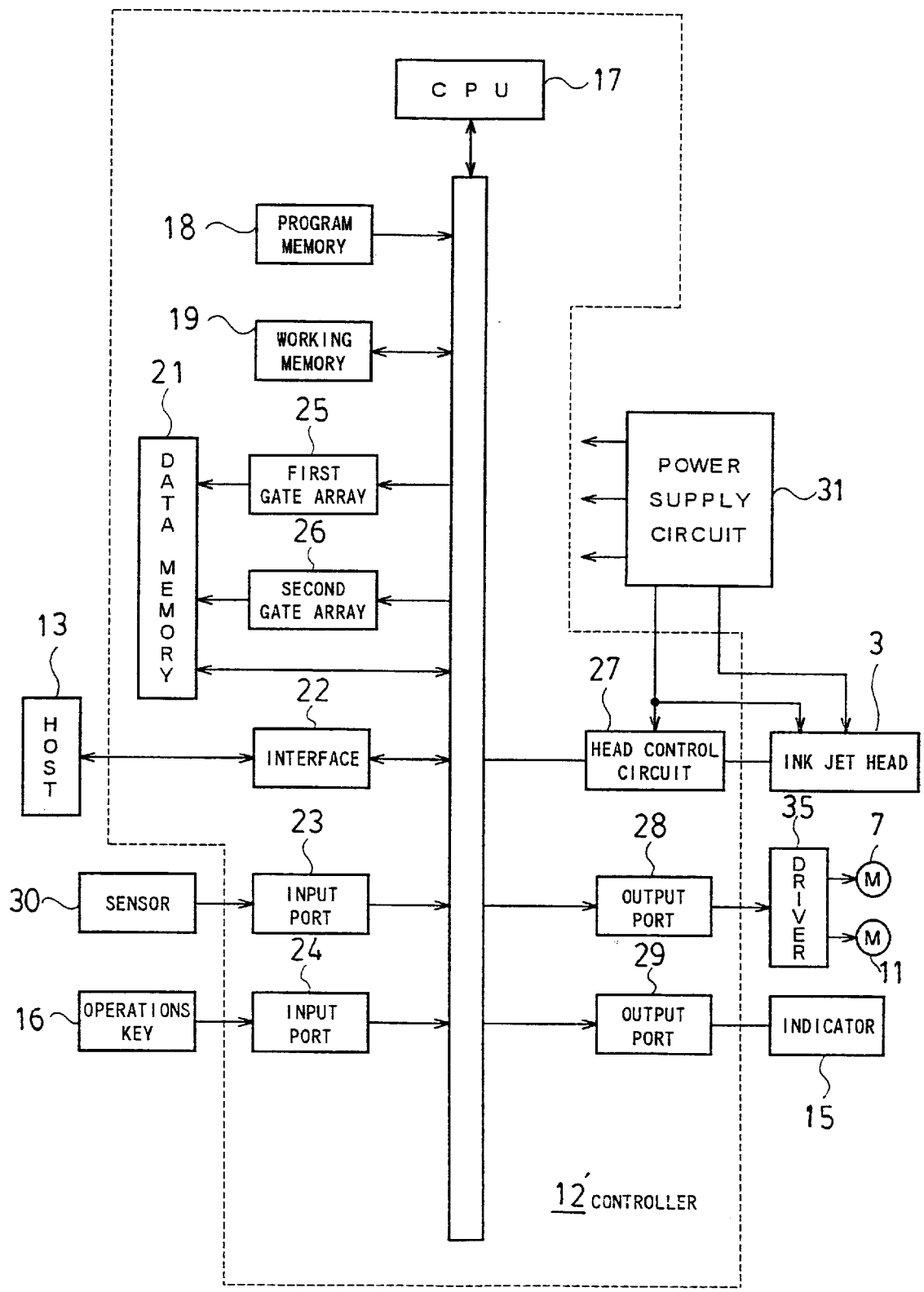
FIG. 8 is a block diagram showing the construction of a control system in a color printer which is used in the printing method according to a third embodiment of the invention.

A controller 12' shown in FIG. 8 has substantially the same construction as the controller 12 shown in FIG. 3, and hence the components which are same as those shown in FIG. 3 are denoted by the same reference numerals and the explanation thereof is omitted here. The controller 12' has a first gate array 25 and a second gate array 26.

The first gate array 25 is a logical circuit for converting the print data which is inputted from the host 13 into M, C and Y data corresponding to the first printing method, and it is the same as the gate array 25 in FIG. 3.

The second gate array 26 is a logical circuit for converting the print data which is inputted from the host 13 into M, C and Y data corresponding to the second printing method.

Either the first gate array 25 or the second gate array 26 is arbitrarily selected from these gate arrays 25 and 26 upon reception of control data from the host 13 or upon the input of a data signal from the operation key 16. The selection of either of the gate arrays is displayed on the indicator 15.

That is, the controller 12' of the color printer is provided with the functions of the first control means and the second control means, and the function of the selection means thereof.

Figure 20:
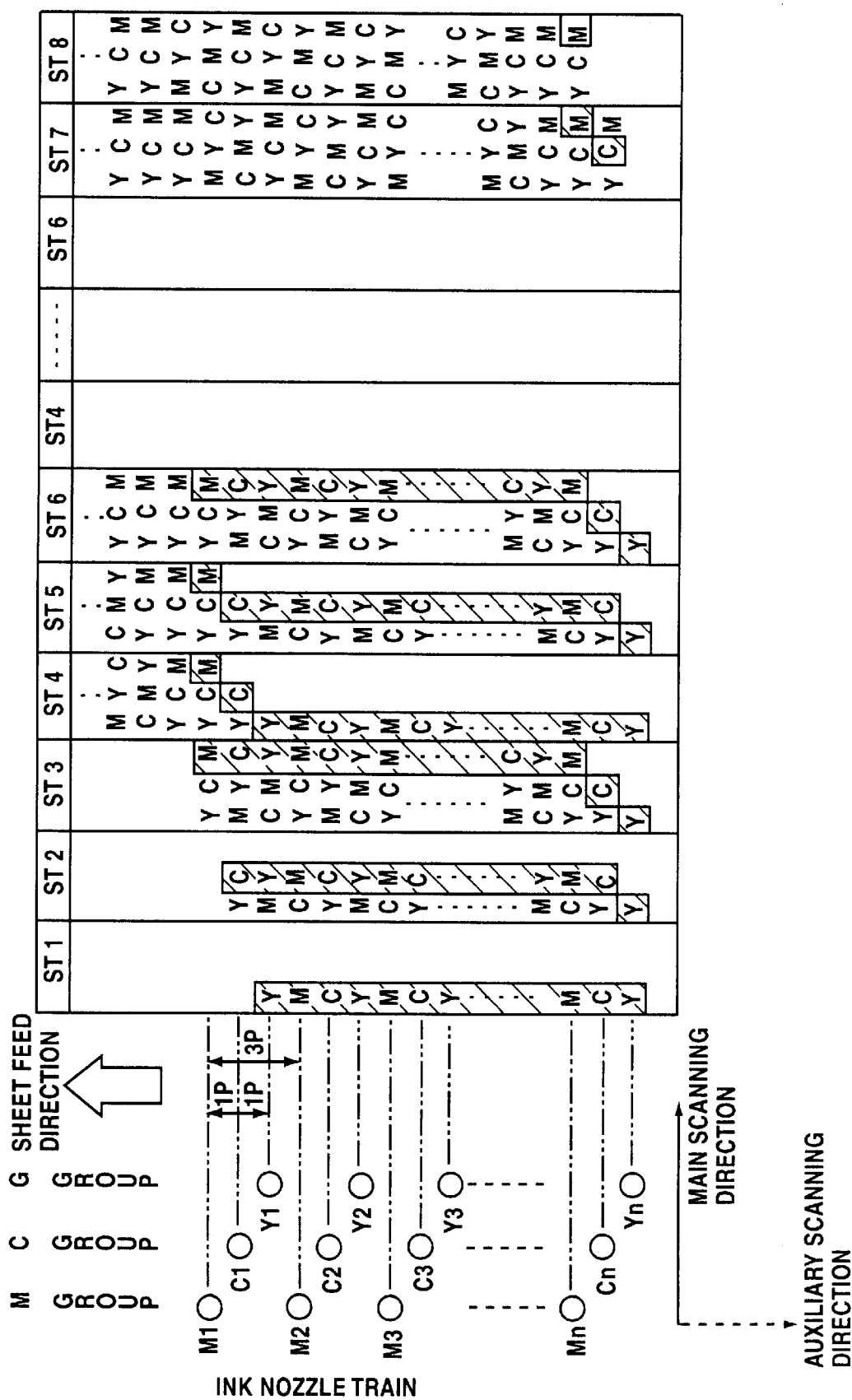
FIG. 20 is a view explaining a third example of printing method using the conventional color printer.

First of all, the second printing method which was explained with reference to FIG. 20 as the third prior art will now be described again with reference to the flow chart in FIG. 9.

Figure 9:
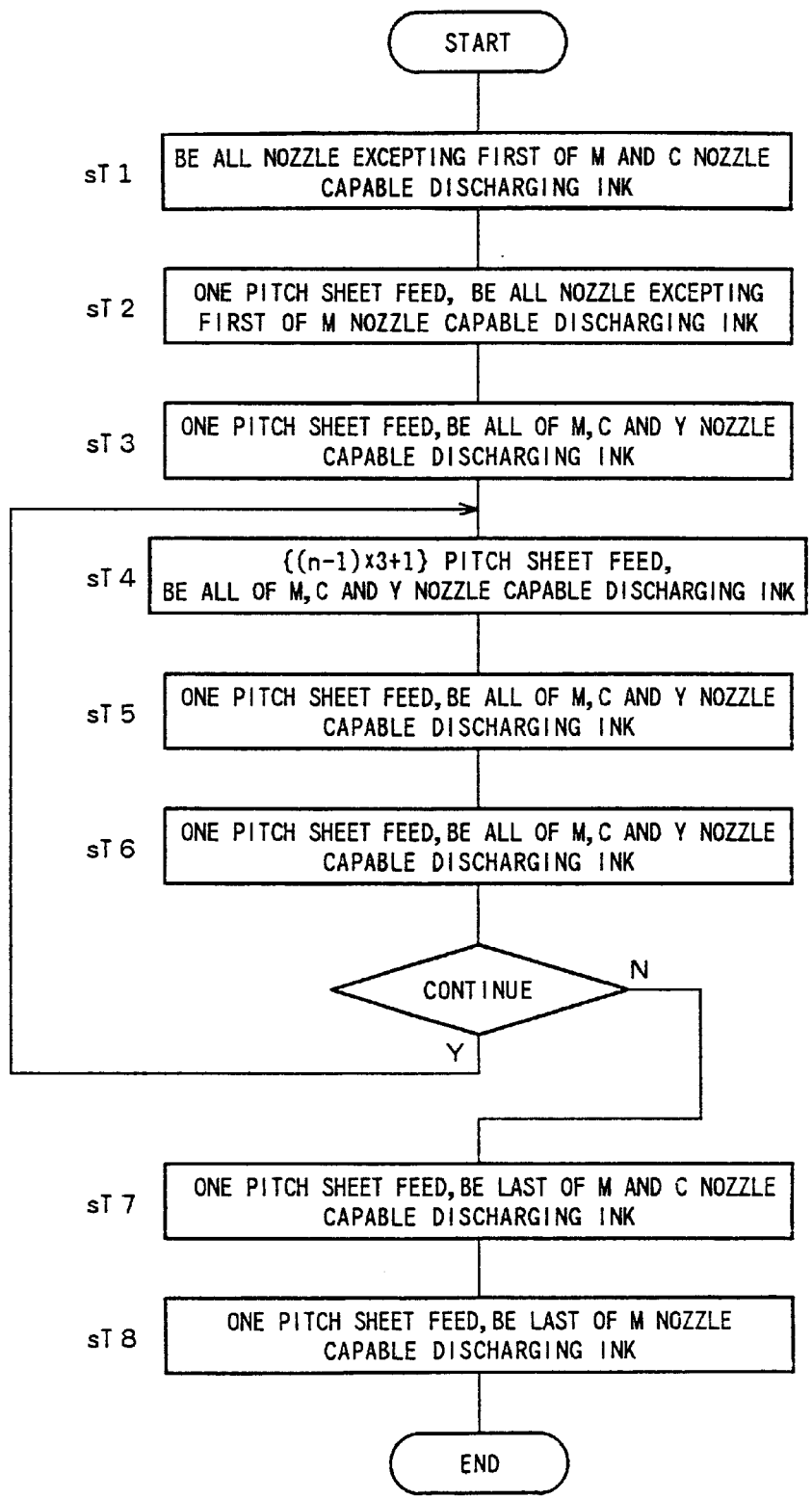
FIG. 9 is a flow chart showing procedures in the printing method of the second embodiment which is executed by the color printer having the control system shown in FIG. 8.

The color printer shown in FIG. 1 to FIG. 8 is started up, then the carriage 1 is set at the printing start position, thereafter the operations, which are the same as those in first to sixth steps ST1, ST2, ST3, ST4, ST5 and ST6 and explained with reference to FIG. 20 as the third prior art, are sequentially performed in first to sixth steps sT1, sT2, sT3, sT4, sT5 and sT6 of the procedures as shown in FIG. 9.

Then, it is judged whether the program continues or not as shown in FIG. 9, and fourth to sixth steps sT4, sT5, sT6 are repeated if the program continues, and then seventh and eighth steps sT7 and sT8, which are the same as those of seventh and eighth steps ST7 and ST8 as third prior art, are subsequently executed after sixth step sT6 if the program does not continue. The printing operation is completed in the order of steps of . . . , sT4, sT5, sT6, sT7 and sT8.

At this time, it is possible to superimpose printed dots of all primary colors of M, C and Y over one another in all lines of the printed image. However, the sequence of superimposition of the colors is varied in the order of MYC, CMY and YCM in some lines as explained hereinbefore. Accordingly, the tone of the synthesized colors R, G and B are varied in some lines, thereby deteriorating uniformity of the tone.

Meanwhile, regarding the feeding in the auxiliary scanning, steps sT4, sT5 and sT6 are the same as those of steps of ST4, ST5 and ST6 in the third prior art while the steps sT4, sT5, sT6 sT4 . . . are executed repeatedly. The auxiliary scanning by one pitch is performed in steps of sT5 and sT6, as shown hereinbefore, and the auxiliary scanning by (n−1)×3+1 pitch in fourth step sT4.

Accordingly, the recording sheet is fed in the auxiliary scanning direction by (n−1)×3+4 pitch between three steps of the repeated execution.

Suppose that this is the second printing method, this is compared with the case of employment of the first printing method of the first embodiment as explained already. The recording sheet is fed by (n−1)×3+5 pitches by executing five steps in the first printing method. Accordingly, if the five steps are converted into 15 steps, the recording sheet is fed by (n−1)×9+15 pitches according to the printing method of the first embodiment while it is fed by (n−1)×15+20 pitches according to the second printing method.

Since the time involved in executing one step is mainly determined by the main scanning time, it is considered to be substantially fixed, and hence the time involved in executing 15 steps is substantially the same both in the first printing method and in the second printing method.

During this period, the dots are printed in (n−1)×9+15 lines according to the first printing method while the dots are printed in (n−1)×15+20 rows according to the second printing method. Accordingly, the printing speed can be increased in the second printing method.

In the case of n=20 dots are printed in 186 lines according to the first printing method while dots are printed in 305 lines according to the second printing method, wherein the printing speed in the second printing method is 1.64 times as fast as that in the first printing method.

Figure 10:
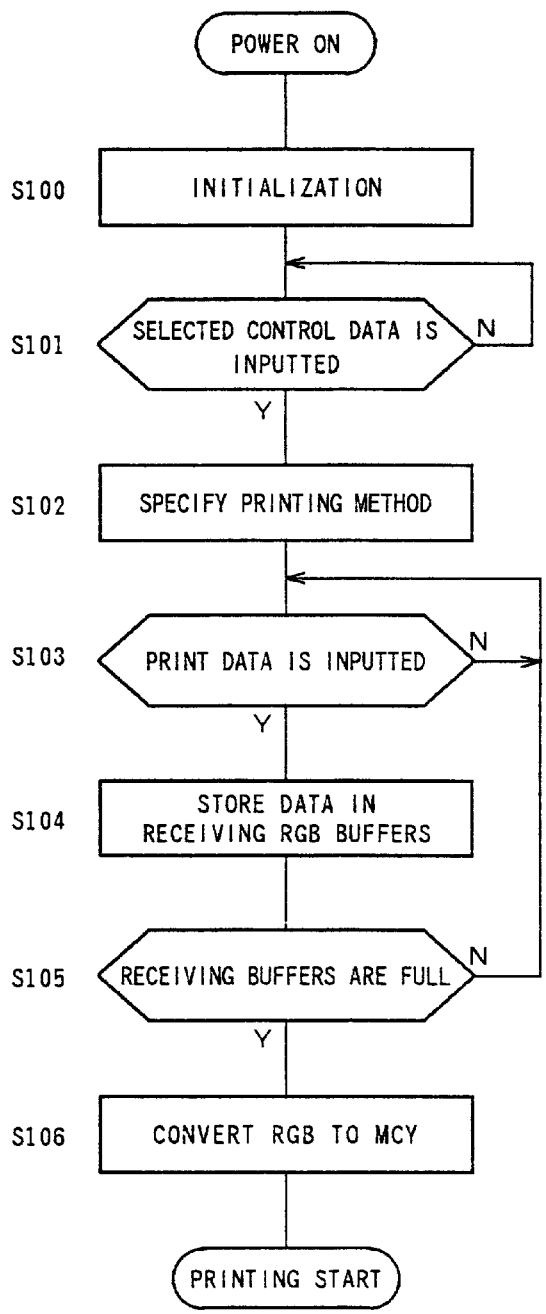
FIG. 10 is a flow chart showing an example of a printing procedure in the case of selecting a printing method based on control data supplied from a host 13 in the color printer having the control system shown in FIG. 8.

FIG. 10 is a flow chart showing an example of printing procedure in the case where the printing method is selected based on the control data from the host 13 in the color recorder having the control system shown in FIG. 8.

The CPU 17 in FIG. 8 executes, after turning power ON. initialization of the controller 12' (S100). Then the CPU 17 goes into standby mode while monitoring the input of the selection control data from the host 13 via the interface 22 (S101).

When the selection control data is inputted in step S101, the CPU 17 specifies the printing method depending on the content of the selection control data, and selects either the gate array 25 or the gate array 26 in accordance with the printing method and makes the selected gate array valid. The control program for making a record in accordance with the first printing method and the control program for making a print in accordance with the second printing method are separately written into the program memory 18 as shown in FIG. 8. The CPU 17 selects either of the control programs depending on the content of data when the selection control data is inputted.

In such a manner, the printing method for the printing operation is specified as either the first printing method or second printing method in step S102.

Subsequently in step S103, the CPU 17 goes into standby mode while monitoring the input of print data from the host 13 via the interface 22.

When the print data is inputted from the host 13, the print data is stored in a receiving RGB buffer provided in the data memory 21 in step S104. Then, the procedures in steps S103 to S105 are repeated until the completion of reception of the prescribed amount of print data from the host 13 (receiving buffers are full) in step S105.

When the CPU 17 discriminates the completion of reception of the print data in step S105, the print data which was received and temporarily stored in the receiving RGB buffer is subjected to conversion by the selected gate array 25 or 26, and the converted data is stored in recording M, C and Y buffers provided in the data memory 21 (R, G and B are converted to M, C and Y). The printing is started in accordance with the selected printing method upon completion of these procedure steps.

If the inputted print data is M, Y and C color data, such data need not be converted, but the print can be immediately started in accordance with the selected printing method.

Figure 11:
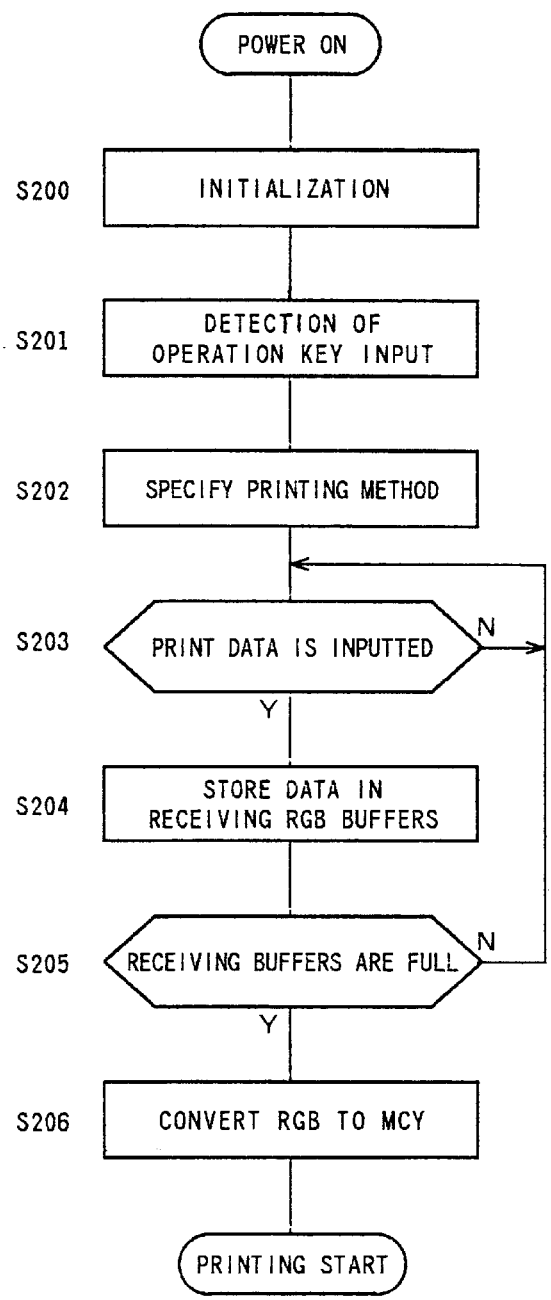
FIG. 11 is a view showing another example of a printing procedure in the case of selecting a printing method by input through an operation key 16 in FIG. 8.

FIG. 11 is a view showing an example of printing procedure in the case of selecting the printing method by the input through the operation key 16.

The CPU 17 executes, after turning power ON, the initialization of the controller 12' (S200). If data for selecting the printing method is inputted when the external operation key 16 is operated, the CPU 17 detects this data via the input port 24 for operation key in step S201.

Either the first printing method or second printing method is specified in step S202 in the same manner as step S102.

Subsequently, printing is started by the selected printing method after the same procedures as those in steps S103 to S106 are executed in steps S203 to S206.

As mentioned above, according to the color printer of the present embodiment, it is possible to make a print by arbitrarily selecting either the first printing method or second printing method. It is possible to select the appropriate printing method in response to the object of printing or to the kinds of print data.

For example, it is possible to select the first printing method when the quality of image takes precedence and to select the second printing method when printing speed takes precedence or when printing a pattern where the sequence of superimposition of colors does not influence the quality of image.

In such a manner, it is possible to enhance the applicability and the convenience of the color printer.

Printing Method According to Fourth Embodiment

A printing method according to the fourth embodiment will be explained hereinafter.

This method makes a print in accordance with the second printing method (method where sequence of colors is not regular) when the printing mode of the print data is a photographic mode, or with the first printing method (method where sequence of colors is regular) when the printing mode of the print data is a graphic mode.

The color printer used in this embodiment has a hard construction which is the same as the color printer used in the third embodiment in FIG. 8.

Figure 12:
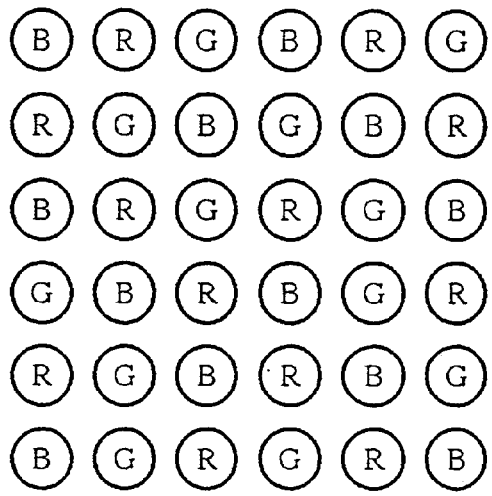
FIG. 12 is a view showing printed dots of a photograph mode in a printing method according to a fourth embodiment of the invention.
Figure 13:
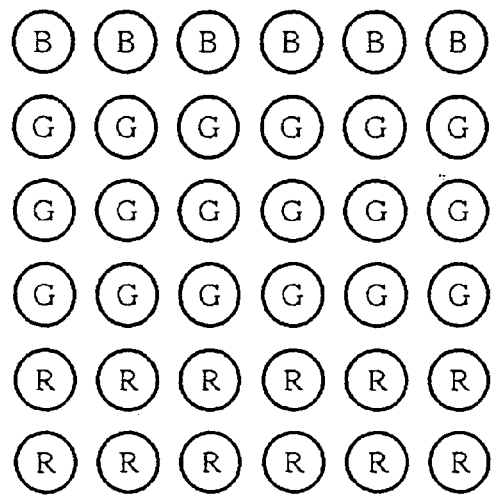
FIG. 13 is a view showing an example of printed dots of a graphic mode in the same embodiment.

FIG. 12 shows an example of printed dots in the photographic mode and the FIG. 13 shows an example of printed dots in the graphic mode.

Figure 14:
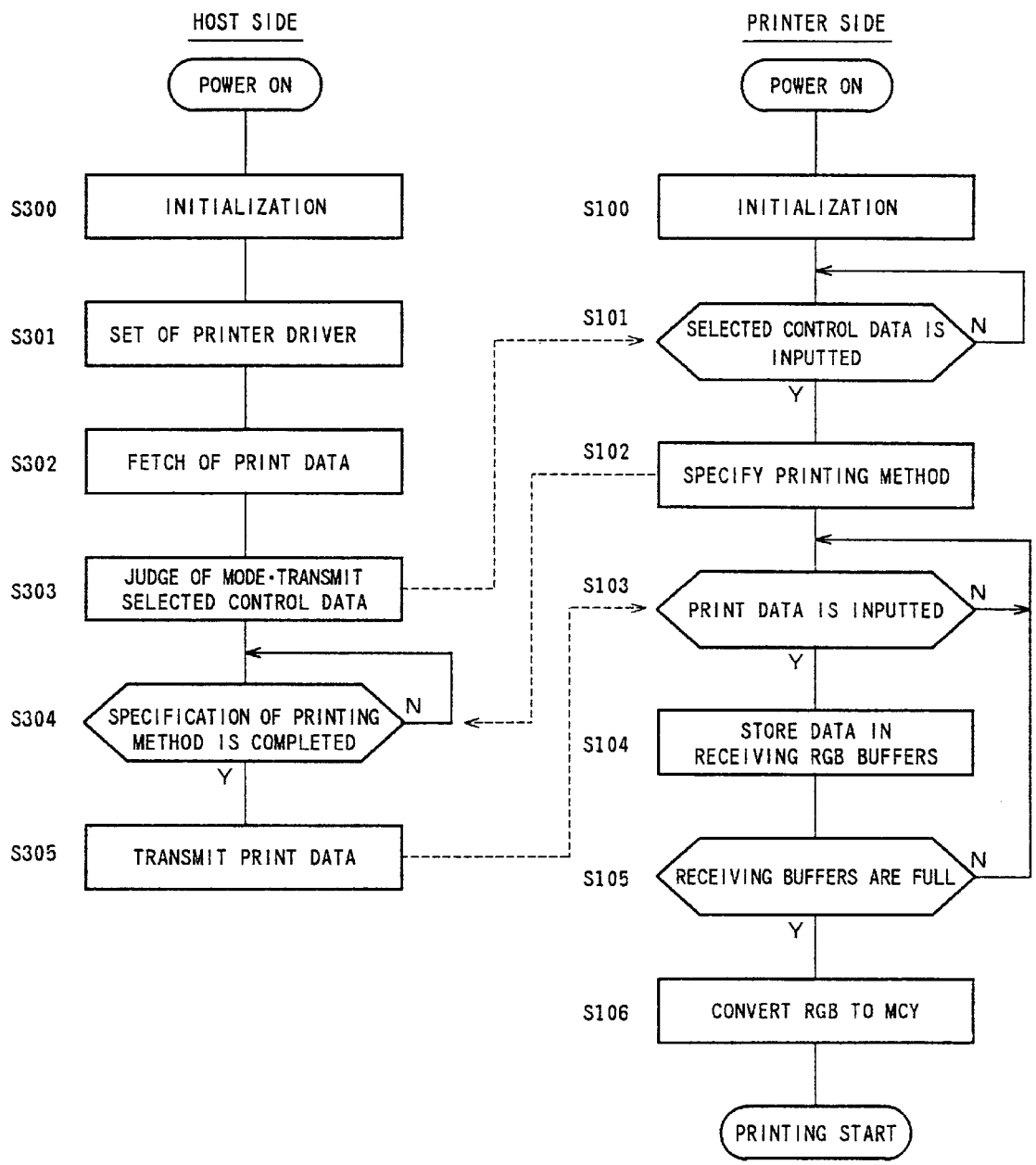
FIG. 14 is a flow chart showing procedures at a host side and at a printer side according to the printing method of the fourth embodiment.

FIG. 14 is a flow chart showing the procedures at the host side and the printer side in the printing method of the fourth embodiment of the invention.

In the printing method in the fourth embodiment, the power of the host 13 is first started up as shown in FIG. 14 to execute the initialization of the host 13 in step S300.

Thereafter, a program for controlling the judgment of the printing mode, described later, and the transmission of the selection control data relative to the printer is stored in a memory of the host 13 by setting of a printer driver.

Subsequently in step S302, the print data is stored in the data memory of the host 13 by a scanner or transmission from an external memory. Then in step S303, it is judged whether the printing mode of the print data is a photographic mode or graphic mode, and the selection control data corresponding to the result of judgment is transmitted to the printer.

Figure 19:
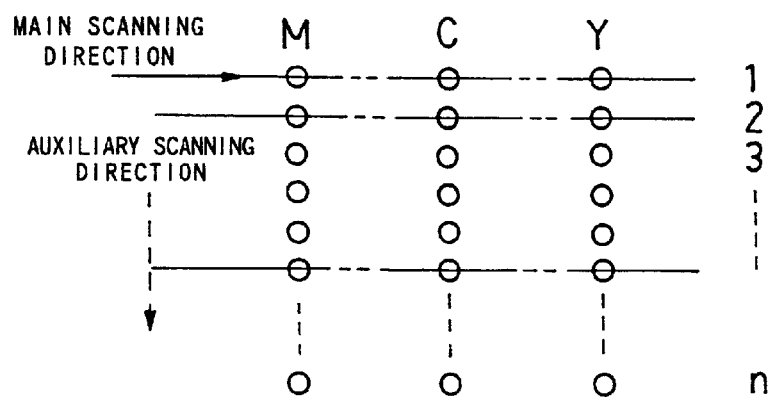
FIG. 19 is a view showing still another example of the arrangement of nozzle holes defined in heads of the conventional color printer.

The photographic mode is chosen if the print data comprises different colors which are mixed with one another dot by dot as shown in FIG. 19 and the control data for selecting the second printing method wherein the sequence of colors is not regular is transmitted to the printer via the interface. If the photographic mode is not choosen, the selection control data for selecting the first printing method wherein the sequence of colors is regular is transmitted.

If dots of the same colors are gathered in groups as shown in FIG. 13, the photographic mode is not chosen.

Before step S303 is executed at the host side, the printer is started up in the same procedure as explained with reference to FIG. 10 in the third embodiment to cause the input of the selection control data in step S101 for executing the printing processing procedure to enter standby mode. When the selection control data is inputted in step S101, the CPU 17 shown in FIG. 8 executes the procedure for specifying the printing method in step S102 as explained hereinbefore.

At this time, the CPU 17 can allow the indicator to indicate the printing method as specified.

Subsequently, in step S304 at the host side, the completion of the specification procedure of the printing method (S102) at the printer side is monitored. Upon completion of the specification procedure, the print data is transmitted to the printer in step S305.

Accordingly, at the printer side, the printing is started in accordance with the printing method specified by the selection control data upon completion of the execution of the procedures in steps S103 to S105 in the same manner as in the third embodiment.

According to this embodiment, the printing is made by the second printing method wherein the sequence of colors is not regular when the printing made with the print data is in the photographic mode. Since the printed dots of the same colors are dispersed minutely in the case of the photographic mode, the change of tone does not appear as a pattern, and hence the quality of image is not so deteriorated even in the case where the sequence of colors is not regular. Accordingly, it is preferable to increase the printing speed according to the second printing method.

However, the print is made by the first printing method wherein the sequence of colors is regular when the printing mode of the print data is in the graphic mode. In the case of the graphic mode, areas occupied by the same colors are large, and hence the change of tone clearly appears when the print is made by the printing method where the sequence of color is not regular, thereby deteriorating the quality of image. Accordingly, taking the quality of image as a precedent over the printing speed, there frequently occurs a case where the print is made by the first printing method where the sequence of color is regular.

As mentioned above, according to the fourth embodiment, it is possible to make an appropriate print in response to the printing mode of the print data.

Printing Method According to Fifth Embodiment, and the Color Printer used in the Same A printing method according to a fifth embodiment and a color printer used in the fifth embodiment will be described hereinafter with reference to FIG. 15 and FIG. 16.

The color printer used in this embodiment has the function to print a common test pattern in a memory capable of selecting the first printing method where the sequence of colors is regular, or the second printing method where the sequence of colors are not regular by use of the above two printing methods for selecting the printing method adapted for the sheet media.

Figure 15:
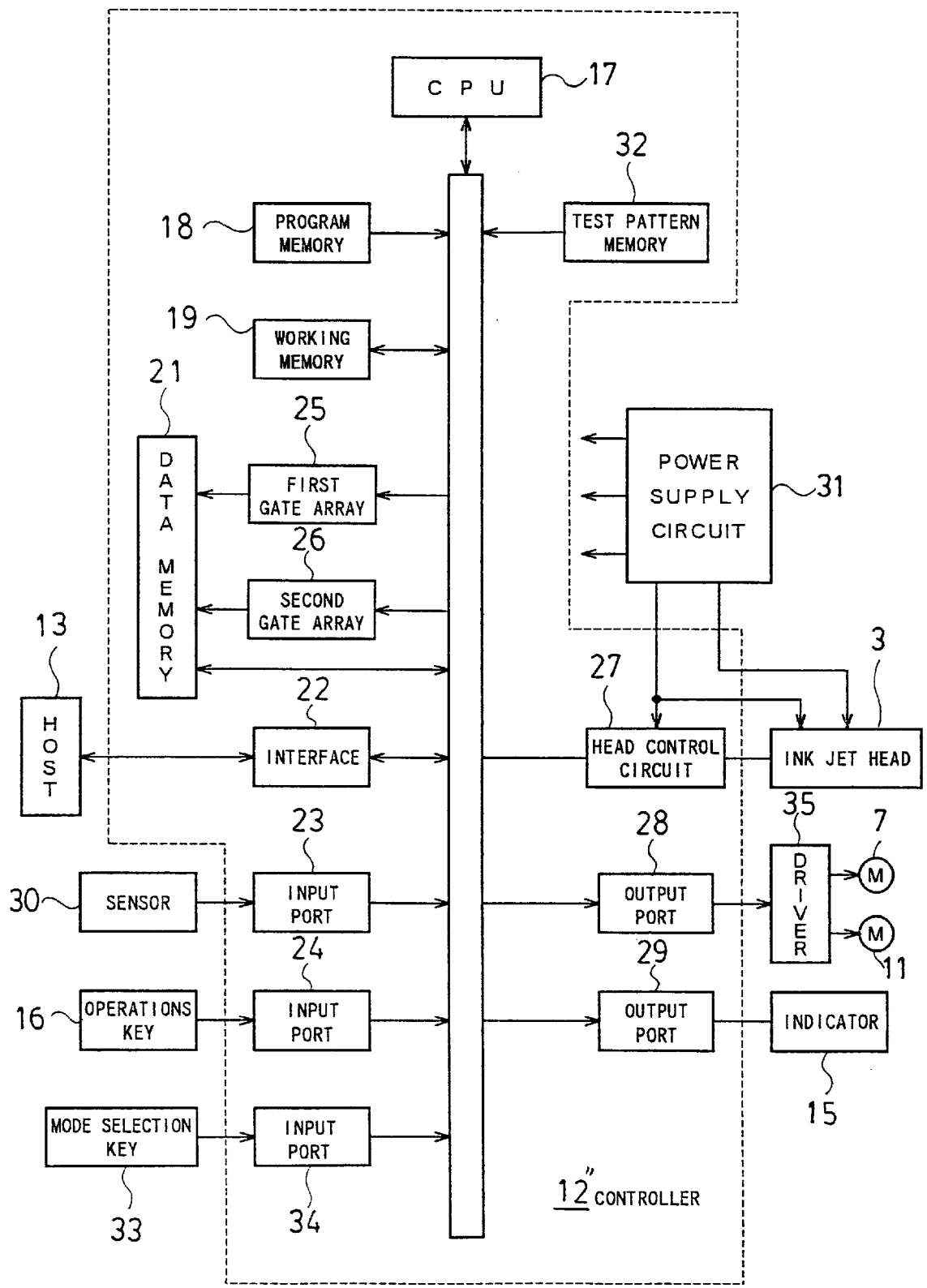
FIG. 15 is a block diagram showing an example of the construction of a control system in a color printer which is used in a printing method according to a fifth embodiment of the invention.

FIG. 15 is a block diagram showing an example of construction of the control system of the color printer. A controller 12" for constituting the control system comprises, in addition to the controller 12' which was used in the third embodiment, a test pattern memory 32 in which data of the test pattern is stored, a mode selection key 33 for selecting whether a test mode for printing the test pattern is a normal printing mode for printing normal data or not, and a mode selection input port 34.

The color printer used in this embodiment is substantially the same as the mechanism shown in FIG. 1.

Figure 16:
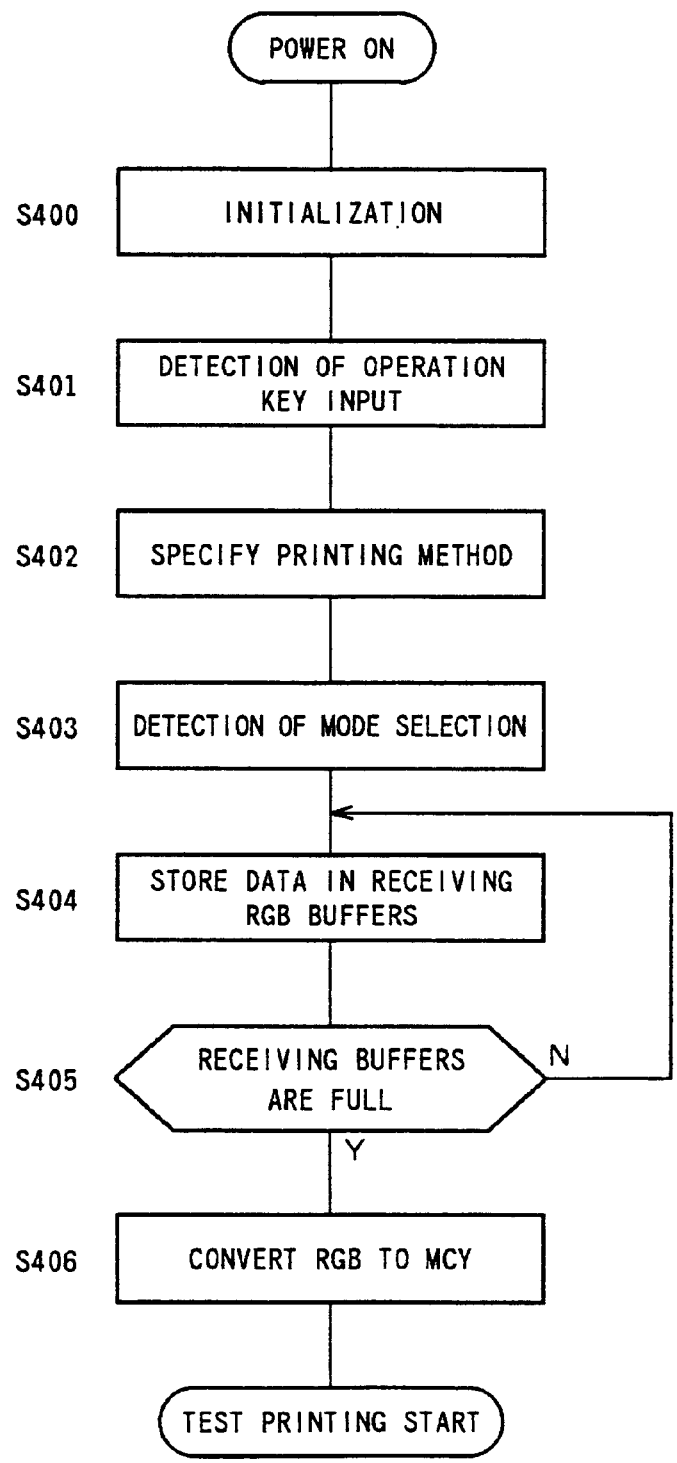
FIG. 16 is a flow chart showing the printing procedure in a test pattern printing mode using the color printer having the control system shown in FIG. 15.
Figure 17:
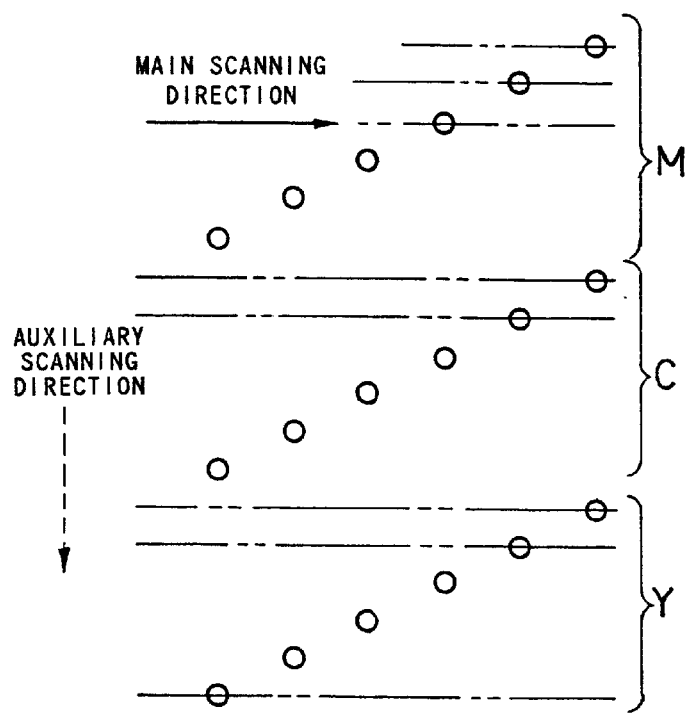
FIG. 17 is a view showing an example of the arrangement of nozzle holes defined in heads of a conventional color printer.
Figure 18:
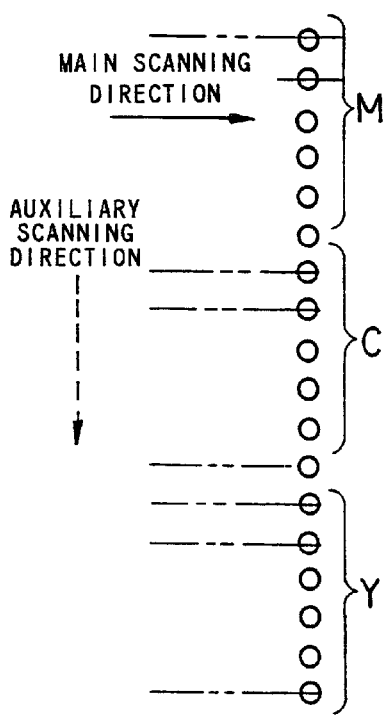
FIG. 18 is a view showing another example of the arrangement of nozzle holes defined in heads of the conventional color printer.

FIG. 16 is a flow chart showing steps of the printing procedure in a test mode of the color printer.

The CPU 17 executes instructions, after turning power ON initialization of the controller 12" shown in FIG. 16 (S400). When data for selecting the printing method is inputted through the operation key 16, the CPU 17 detects the data via the input port 24 in step S401, and specifies either the first printing method or the second printing method in step S402.

If control data TD for selecting a test pattern is inputted by the mode selection key 33, the CPU 17 detects this data via the mode selection input port 34 in step S403. As a result, the CPU 17 reads the test pattern data from the test pattern memory (ROM) 32 and this data is stored in a receiving RGB buffer provided in the data memory 21.

In steps S405, the procedures in steps S404 and S405 are repeated until the CPU 17 discriminates the completion of reception of the prescribed amount of print data (receiving buffers are full) from the test pattern memory 32.

When the CPU 17 discriminates the completion of reception in step S40, the print data of the test pattern stored in the receiving RGB buffer is subjected to conversion by the selected gate array, and the converted print data is stored in printing buffers for M, C and Y provided in the data memory 21 (R, G and B are converted to M, C and Y).

Upon completion of this procedure, the test printing is started by the selected printing method. As a result, the test pattern is printed on the recording sheet(media) by the selected printing method.

In such a manner, the same test patterns are printed on the same kind of recording sheet using the first and second printing methods, and the printed test patterns are compared with each other, thereby allowing the printing method adapted for the recording sheet to be selected based on the print quality, etc.

There is a case where the printing methods must be differentiated depending on the recording sheet, whether it is a normal sheet of paper or an OHP, for example. If the printing method adapted for a specific kind of recording media is determined in such a manner, control data ND for selecting a normal printing (printing of print data inputted from the host) is inputted by the mode selection key 33. It is possible to make a print by selecting the printing method adapted for the recording sheet based on the print data from the host 13 after the test mode is cleared.

According to the color printer of this embodiment, a printing method adapted for the recording sheet can be easily selected by the test mode before normal printing is performed, thereby performing the printing efficiently from the beginning without having to perform normal printing again, which is excellent in indicating quality, etc.

INDUSTRIAL APPLICABILITY

As mentioned above, it is possible to make a print of multiple colors which is uniform in image quality by using a small sized color printer using ink jet heads which are easily manufactured when making a print of colors sequenced in superimposition which is regulars even in one-way printing or bidirectional printing.

Further, according to the present invention, it is possible to make a print by arbitrarily selecting the first printing method wherein the sequence of superimposition of colors is regular but the printing speed is slow or the second printing method wherein the sequence superimposition of colors is not regular but the printing speed is fast.

Accordingly, a user of the printer can select an appropriate printing method in accordance with the object of printing or the kind of printing pattern so that the applicability and convenience of the ink jet type color printer can be enhanced.

What is claimed is:

1. A color printer provided with ink jet heads comprising three trains of nozzle holes for respectively discharging different colored inks, each train of nozzle holes composed of a plurality of nozzle holes which are arranged at intervals of three pitches in an auxiliary scanning direction, and the nozzle holes of the three trains of nozzle holes are disposed at equal intervals in a main scanning direction while shifting every one pitch in the auxiliary scanning direction wherein said different colored inks are discharged and sequentially superimposed over one another on a recording medium to synthesize colors so as to make a color print; wherein the color printer further comprises control means for controlling the ink jet heads to make a print which is regular in sequence of superimposition of colors in the manner of;

discharging only one colored ink through the nozzle hole of a first train of nozzle holes which is any one of the three trains of nozzle holes to make a print on the recording medium as the ink jet heads are scanned in the main scanning direction in a first step;

discharging ink through the nozzle holes of the first train of nozzle holes and the nozzle holes of a second train of nozzle holes adjacent to the first train of nozzle holes to make a print on the recording medium as the ink jet heads are scanned in the main scanning direction while they are shifted by one pitch in the auxiliary scanning direction relative to the recording medium in a second step;

discharging ink through all nozzle holes of the first, second and remaining third trains of nozzle holes to make a print on the recording medium as the ink jet heads are scanned in the main scanning direction while they are shifted by one pitch in the auxiliary scanning direction relative to the recording medium in a third step;

discharging ink through all nozzle holes of the second and third trains of nozzle holes and only through the last nozzle hole of the first train of nozzle holes in the auxiliary scanning direction to make a print on the recording medium as the ink jet heads are scanned in the main scanning direction while they are shifted by one pitch in the auxiliary scanning direction relative to the recording medium in a fourth step;

discharging ink through all nozzle holes of the third train of nozzle holes and only through the last nozzle holes of the first and second trains of nozzle holes in the auxiliary scanning direction to make a print on the recording medium as the ink jet heads are scanned in the main scanning direction while they are shifted by one pitch in the auxiliary scanning direction relative to the recording medium in a fifth step;

discharging ink through all nozzle holes of the first train of nozzle holes and only through the first nozzle holes of the second and third trains of nozzle holes in the auxiliary scanning direction to make a print on the recording medium as the ink jet heads are scanned in the main scanning direction while they are shifted by (n−1)×3+1 pitches (n is the number of nozzle holes of each nozzle train) in the auxiliary scanning direction relative to the recording medium in a sixth step;

discharging ink through all nozzle holes of the first and second trains of nozzle holes and only through the first nozzle hole of the third train of nozzle holes in the auxiliary scanning direction to make a print on the recording medium as the ink jet heads are scanned in the main scanning direction while they are shifted by one pitch in the auxiliary scanning direction relative to the recording medium in a seventh step;

executing printing operations sequentially in the third to seventh steps;

discharging ink only through the last nozzle holes of the second and third trains of nozzle holes in the auxiliary scanning direction to make a print on the recording medium as the ink jet heads are scanned in the main scanning direction while they are shifted by one pitch in the auxiliary scanning direction relative to the recording medium in a step following the fifth step when ending the printing; and then discharging ink only through the last nozzle hole of the third train of nozzle holes in the auxiliary scanning direction to make a print on the recording medium while the ink jet heads are scanned in the main scanning direction while they are shifted by one pitch in the auxiliary scanning direction relative to the recording medium so as to end the printing.

2. A color printer provided with ink jet heads comprising three trains of nozzle holes for respectively discharging different colored inks, each train of nozzle holes composed of a plurality of nozzle holes which are arranged at intervals of three pitches in the auxiliary scanning direction, and the nozzle holes of the three trains of nozzle holes are disposed at equal intervals in the main scanning direction while shifting every one pitch in the auxiliary scanning direction wherein said different colored inks are discharged and sequentially superimposed over one another on a recording medium to synthesize colors so as to make a color print, wherein the color printer further comprises:

first control means for controlling the ink jet heads to make a print which is regular in sequence of superimposition of colors in the manner of;

discharging only one colored ink through the nozzle hole of a first train of nozzle holes which is any one of the three trains of nozzle holes to make a print on the recording medium as the ink jet heads are scanned in the main scanning direction in a first step;

discharging ink through the nozzle holes of the first train of nozzle holes and the nozzle holes of a second train of nozzle holes adjacent to the first train of nozzle holes to make a print on the recording medium as the ink jet heads are scanned in the main scanning direction while they are shifted by one pitch in the auxiliary scanning direction relative to the recording medium in a second step;

discharging ink through all nozzle holes of the first, second and remaining third trains of nozzle holes to make a print on the recording medium as the ink jet heads are scanned in the main scanning direction while they are shifted by one pitch in the auxiliary scanning direction relative to the recording medium in a third step;

discharging ink through all nozzle holes of the second and third trains of nozzle holes and only through the last nozzle hole of the first train of nozzle holes in the auxiliary scanning direction to make a print on the recording medium as the ink jet heads are scanned in the main scanning direction while they are shifted by one pitch in the auxiliary scanning direction relative to the recording medium in a fourth step;

discharging ink through all nozzle holes of the third train of nozzle holes and only through the last nozzle holes of the first and second trains of nozzle holes in the auxiliary scanning direction to make a print on the recording medium as the ink jet heads are scanned in the main scanning direction while they are shifted by one pitch in the auxiliary scanning direction relative to the recording medium in a fifth step:

discharging ink through all nozzle holes of the first train of nozzle holes and only through the first nozzle holes of the second and third trains of nozzle holes in the auxiliary scanning direction to make a print on the recording medium as the ink jet heads are scanned in the main scanning direction while they are shifted by (n−1)×3+1 pitches (n is the number of nozzle holes of each nozzle train) in the auxiliary scanning direction relative to the recording medium in a sixth step;

discharging ink through all nozzle holes of the first and second trains of nozzle holes and only through the first nozzle hole of the third train of nozzle holes in the auxiliary scanning direction to make a print on the recording medium as the ink jet heads are scanned in the main scanning direction while they are shifted by one pitch in the auxiliary scanning direction relative to the recording medium in a seventh step;

executing printing operations sequentially in the third to seventh steps;

discharging ink only through the last nozzle holes of the second and third trains of nozzle holes in the auxiliary scanning direction to make a print on the recording medium as the ink jet heads are scanned in the main scanning direction while they are shifted by one pitch in the auxiliary scanning direction relative to the recording medium in a step following the fifth step when ending the printing; and then discharging ink only through the last nozzle hole of the third train of nozzle holes in the auxiliary scanning direction to make a print on the recording medium while the ink jet heads are scanned in the main scanning direction while they are shifted by one pitch in the auxiliary scanning direction relative to the recording medium so as to end the printing;

second control means for controlling the ink jet heads to make a print which is irregular in sequence of superimposition of colors by discharging ink through all nozzle holes to make a print on the recording medium while prohibiting ink from being discharged through respective first nozzle holes of the two trains of nozzle holes of the three trains of nozzle holes in the auxiliary scanning direction as the ink jet heads are scanned in the main scanning direction, then discharging ink through all nozzle holes to make a print on the recording medium while prohibiting ink from being discharged only through the first nozzle hole of either of the two trains of nozzle holes in the auxiliary scanning direction as the ink jet heads are scanned in the main scanning direction while they are shifted by one pitch in the auxiliary scanning direction relative to the recording medium, and thereafter discharging ink through all nozzle holes of the three trains of nozzle holes to make a print on the recording medium as the ink jet heads are scanned in the main scanning direction while they are shifted by one pitch in the auxiliary scanning direction relative to the recording medium; and selection means for selecting either the first control means or the second control means to control the ink jet heads when the printing is performed.

3. The color printer according to claim 2, wherein the selection control means selects either the first control means or the second control means when an external operation member is operated.

4. The color printer according to claim 2, wherein the selection control means includes printing mode judgement means for selecting the printing mode of the print data is a photographic mode or a graphic mode, and for selecting the second control means if the printing mode is the photographic mode and selecting the first control means if the printing mode is the graphic mode in response to the result of judgement.

5. The color printer according to claim 2, further comprising a test pattern memory for storing therein test pattern data and test pattern printing means for reading the test pattern data from the test pattern memory to cause the control means selected by the selection means to control the ink jet heads to make a print.

6. The color printer according to claim 5, further comprising mode selection means for selecting a test mode for printing the test pattern and a normal printing mode for printing normal print data.

7. A printing method using a color printer provided with ink jet heads comprising three trains of nozzle holes for respectively discharging different colored ink, each train of nozzle holes being composed of a plurality of nozzle holes which are arranged at intervals of three pitches in an auxiliary scanning direction, and the nozzle holes of the three trains of nozzle holes are disposed at equal intervals in a main scanning direction while shifting every one pitch in the auxiliary scanning direction wherein different colored inks are discharged and sequentially superimposed over one another on a recording medium to synthesize colors so as to make a color print, the method comprising the following steps for making a print which is regular in sequence of superimposition of colors;

discharging only one colored ink through the nozzle holes of a first train of nozzle holes which is any one of three trains of nozzle holes to make a print on the recording medium as the ink jet heads are scanned in the main scanning direction in a first step;

discharging ink through the nozzle holes of the first train of nozzle holes and the nozzle holes of a second train of nozzle holes adjacent to the first train of nozzle holes to make a print on the recording medium as the ink jet heads are scanned in the main scanning direction while they are shifted by one pitch in the auxiliary scanning direction relative to the recording medium in a second step;

discharging ink through all nozzle holes of the first, second and remaining third trains of nozzle holes to make a print on the recording medium as the ink jet heads are scanned in the main scanning direction while they are shifted by one pitch in the auxiliary scanning direction relative to the recording medium in a third step;

discharging ink through all nozzle holes of the second and third trains of nozzle holes and only through the last nozzle hole of the first train of nozzle holes in the auxiliary scanning direction to make a print on the recording medium as the ink jet heads are scanned in the main scanning direction while they are shifted by one pitch in the auxiliary scanning direction relative to the recording medium in a fourth step;

discharging ink through all nozzle holes of the third train of nozzle holes and only through the last nozzle holes of the first and second trains of nozzle holes in the auxiliary scanning direction to make a print on the recording medium as the ink jet heads are scanned in the main scanning direction while they are shifted by one pitch in the auxiliary scanning direction relative to the recording medium in a fifth step;

discharging ink through all nozzle holes of the first train of nozzle holes and only through the first nozzle holes of the second and third trains of nozzle holes in the auxiliary scanning direction to make a print on the recording medium as the ink jet heads are scanned in the main scanning direction while they are shifted by $(n-1) \times 3+1$ pitches (n is the number of nozzle holes of each nozzle train) in the auxiliary scanning direction relative to the recording medium in a sixth step;

discharging ink through all nozzle holes of the first and second trains of nozzle holes and only through the first nozzle hole of the third train of nozzle holes in the auxiliary scanning direction to make a print on the recording medium as the ink jet heads are scanned in the main scanning direction while they are shifted by one pitch in the auxiliary scanning direction relative to the recording medium in a seventh step;

executing printing operations sequentially in the third to seventh steps;

discharging ink only through the last nozzle holes of the second and third trains of nozzle holes in the auxiliary scanning direction to make a print on the recording medium as the ink jet heads are scanned in the main scanning direction while they are shifted by one pitch in the auxiliary scanning direction relative to the recording medium in a step following the fifth step when ending the printing; and then discharging ink only through the last nozzle hole of the third train of nozzle holes in the auxiliary scanning direction to make a print on the recording medium as the ink jet heads are scanned in the main scanning direction while they are shifted by one pitch in the auxiliary scanning direction relative to the recording medium so as to end the printing.

8. A printing method using a color printer provided with ink jet heads comprising three trains of nozzle holes for respectively discharging different colored ink, each train of nozzle holes being composed of a plurality of nozzle holes which are arranged at intervals of three pitches in the auxiliary scanning direction, and the nozzle holes of the three trains of nozzle holes are disposed at equal intervals in the main scanning direction while shifting every one pitch in the auxiliary scanning direction wherein different colored inks are discharged and sequentially superimposed over one another on a recording medium to synthesize colors so as to make a color print, the method comprising:

a first printing method of making a print which is regular in sequence of superimposition of colors, said method composed of steps of:

discharging only one colored ink through the nozzle hole of a first train of nozzle holes which is any one of three trains of nozzle holes to make a print on the recording medium as the ink jet heads are scanned in the main scanning direction in a first step;

discharging ink through the nozzle holes of the first train of nozzle holes and the nozzle holes of a second train of nozzle holes adjacent to the first train of nozzle holes to make a print on the recording medium as the ink jet heads are scanned in the main scanning direction while they are shifted by one pitch in the auxiliary scanning direction relative to the recording medium in a second step;

discharging ink through all nozzle holes of the first, second and remaining third trains of nozzle holes to make a print on the recording medium as the ink jet heads are scanned in the main scanning direction while they are shifted by one pitch in the auxiliary scanning direction relative to the recording medium in a third step;

discharging ink through all nozzle holes of the second and third trains of nozzle holes and only through the last nozzle hole of the first train of nozzle holes in the auxiliary scanning direction to make a print on the recording medium as the ink jet heads are scanned in the main scanning direction while they are shifted by one pitch in the auxiliary scanning direction relative to the recording medium in a fourth step;

discharging ink through all nozzle holes of the third train of nozzle holes and only through the last nozzle holes of the first and second trains of nozzle holes in the auxiliary scanning direction to make a print on the recording medium as the ink jet heads are scanned in the main scanning direction while they are shifted by one pitch in the auxiliary scanning direction relative to the recording medium in a fifth step;

discharging ink through all nozzle holes of the first train of nozzle holes and only through the first nozzle holes of the second and third trains of nozzle holes in the auxiliary scanning direction to make a print on the recording medium as the ink jet heads are scanned in the main scanning direction while they are shifted by (n−1)×3+1 pitches (n is the number of nozzle holes of each nozzle train) in the auxiliary scanning direction relative to the recording medium in a sixth step;

discharging ink through all nozzle holes of the first and second trains of nozzle holes and only through the first nozzle hole of the third train of nozzle holes in the auxiliary scanning direction to make a print on the recording medium as the ink jet heads are scanned in the main scanning direction while they are shifted by one pitch in the auxiliary scanning direction relative to the recording medium in a seventh step;

executing printing operations sequentially in the third to seventh steps;

discharging ink only through the last nozzle holes of the second and third trains of nozzle holes in the auxiliary scanning direction to make a print on the recording medium as the ink jet heads are scanned in the main scanning direction while they are shifted by one pitch in the auxiliary scanning direction relative to the recording medium in a step following the fifth step when ending the printing; and then discharging ink only through the last nozzle hole of the third train of nozzle holes in the auxiliary direction to make a print on the recording medium as the ink jet heads are scanned in the main scanning direction while they are shifted by one pitch in the auxiliary scanning direction relative to the recording medium so as to end the printing; and a second printing method of making a print which is irregular in sequence of superimposition of colors, said method being composed of steps of discharging ink through all nozzle holes to make a print on the recording medium while prohibiting ink from being discharged through respective first nozzle holes of the two trains of nozzle holes of the three trains of nozzle holes in the auxiliary scanning direction as the ink jet heads are scanned in the main scanning direction, then discharging ink through all nozzle holes to make a print on the recording medium while prohibiting ink from being discharged only through the first nozzle hole of either of the two trains of nozzle holes in the auxiliary scanning direction as the ink jet heads are scanned in the main scanning direction while they are shifted by one pitch in the auxiliary scanning direction relative to the recording medium, and thereafter discharging ink through all nozzle holes of the three trains of nozzle holes to make a print on the recording medium as the ink jet heads are scanned in the main scanning direction while they are shifted by one pitch in the auxiliary scanning direction relative to the recording medium; and wherein the first control method or the second control method is arbitrarily or automatically selected to make a print.

9. The printing method using the color printer according to claim 8, further comprising a step of selecting the first printing method or the second printing method by detecting an operation of an external operation member.

10. The printing method using the color printer according to claim 8, further comprising a step of selecting the first printing method or the second printing method based on the control data from a host.

11. The printing method using the color printer according to claim 8, further comprising steps of judging whether a printing mode of print data is a photographic mode or a graphic mode, and of selecting the second printing method if the printing mode is the photographic mode and of selecting the first printing method if the printing mode is the graphic mode.

* * * * *